US012644774B2

(12) United States Patent
Boswall-Perks et al.

(10) Patent No.: US 12,644,774 B2
(45) Date of Patent: Jun. 2, 2026

(54) ULTRA THIN WIRELESS LABEL WITH IMPROVED TEMPERATURE-BASED OPERATIONS

(71) Applicant: Reelables, Inc., Seattle, WA (US)

(72) Inventors: Oliver Peregrine Boswall-Perks, London (GB); Steven Andrew Swinbank, London (GB); Brian Grant Krejcarek, London (GB)

(73) Assignee: Reelables, Inc., Seattle, WA (US)

( * ) Notice: Subject to any disclaimer, the term of this patent is extended or adjusted under 35 U.S.C. 154(b) by 0 days.

(21) Appl. No.: 18/965,707

(22) Filed: Dec. 2, 2024

(65) Prior Publication Data

US 2025/0093209 A1      Mar. 20, 2025

Related U.S. Application Data

(63) Continuation-in-part of application No. 18/416,666, filed on Jan. 18, 2024.

(60) Provisional application No. 63/438,845, filed on Jan. 13, 2023.

(51) Int. Cl.
| | |
|---|---|
| *G01K 1/024* | (2021.01) |
| *G01K 1/14* | (2021.01) |
| *G06Q 10/0832* | (2023.01) |

(52) U.S. Cl.
CPC ............... G01K 1/024 (2013.01); G01K 1/14 (2013.01); G06Q 10/0832 (2013.01)

(58) Field of Classification Search
None
See application file for complete search history.

(56) References Cited

U.S. PATENT DOCUMENTS

| | | | |
|---|---|---|---|
| 5,150,969 A | 9/1992 | Goldberg et al. | |
| 6,906,436 B2 * | 6/2005 | Jenson ..................... | H01M 6/40 |
| | | | 429/162 |
| 8,399,951 B2 * | 3/2013 | Takatori ................. | G01K 7/015 |
| | | | 257/467 |
| 8,618,914 B2 * | 12/2013 | Bachman ........... | G06K 19/0702 |
| | | | 340/584 |
| 9,918,638 B2 | 3/2018 | Cinbis et al. | |
| 10,002,359 B2 | 6/2018 | Atkinson et al. | |
| 11,693,383 B1 | 7/2023 | Smith et al. | |

(Continued)

FOREIGN PATENT DOCUMENTS

CN          110907069 A      3/2020

*Primary Examiner* — Muhammad Adnan
(74) *Attorney, Agent, or Firm* — Cognition IP, P.C.; Edward Steakley; Saleh Kaihani

(57) ABSTRACT

An ultra-thin film wireless label can include a temperature sensor. The wireless label can be attached to an object, and the wireless label can be used as a temperature monitoring device. The wireless label can have a stacked structure laying the temperature sensor to have efficient thermal contact with the object, while being relatively insulated from the environment via an insulating layer. The temperature sensor can be calibrated, and the calibration parameters can be stored and used to generate accurate temperature readings. The calibrated wireless label can be used in a variety of applications, including performing battery-saving operations, detecting open-box events, and monitoring temperature of items stored in subzero environments. Some embodiments include activating a wireless label, during a printing process.

18 Claims, 9 Drawing Sheets

(56) References Cited

U.S. PATENT DOCUMENTS

| | | | | |
|---|---|---|---|---|
| 11,714,005 | B2 | 8/2023 | Fegely et al. | |
| 12,367,357 | B1* | 7/2025 | Patel | B41J 3/4075 |
| 12,498,274 | B2 | 12/2025 | Krug et al. | |
| 12,530,989 | B2* | 1/2026 | Krejcarek | G09F 3/0297 |
| 2003/0231106 | A1* | 12/2003 | Shafer | H01Q 1/44 |
| | | | | 340/10.34 |
| 2004/0131761 | A1* | 7/2004 | Shakespeare | G06K 19/077 |
| | | | | 118/729 |
| 2004/0131897 | A1* | 7/2004 | Jenson | H01M 50/119 |
| | | | | 429/162 |
| 2008/0129510 | A1* | 6/2008 | Tuttle | G01S 13/758 |
| | | | | 340/572.7 |
| 2008/0194057 | A1* | 8/2008 | Hsiao | H10D 1/47 |
| | | | | 257/E21.511 |
| 2011/0140856 | A1* | 6/2011 | Downie | G06K 19/0723 |
| | | | | 340/10.1 |
| 2012/0019240 | A1* | 1/2012 | Muller | G01N 33/54326 |
| | | | | 324/244 |

| | | | | |
|---|---|---|---|---|
| 2014/0239065 | A1* | 8/2014 | Zhou | G06F 1/1677 |
| | | | | 235/380 |
| 2016/0374188 | A1* | 12/2016 | Asai | H05H 1/12 |
| 2016/0381438 | A1* | 12/2016 | Wilkinson | G01K 1/024 |
| | | | | 340/870.02 |
| 2017/0331043 | A1* | 11/2017 | Kuhn | C08G 61/124 |
| 2019/0125990 | A1* | 5/2019 | Holtz | A61M 15/0083 |
| 2019/0236424 | A1* | 8/2019 | Atkinson | G06K 19/07707 |
| 2020/0090016 | A1 | 3/2020 | Gill | |
| 2020/0334628 | A1* | 10/2020 | Goldberg | G06Q 30/0633 |
| 2021/0106764 | A1* | 4/2021 | Toporek | G09F 9/37 |
| 2021/0362564 | A1* | 11/2021 | Polyzois | B60H 1/00971 |
| 2022/0092376 | A1* | 3/2022 | Volkerink | H04W 4/029 |
| 2022/0110189 | A1* | 4/2022 | Volkerink | H04W 4/029 |
| 2022/0159354 | A1 | 5/2022 | Williams et al. | |
| 2022/0309309 | A1* | 9/2022 | Demidov | B32B 27/10 |
| 2024/0048181 | A1* | 2/2024 | Krejcarek | H04B 5/77 |
| 2025/0014736 | A1* | 1/2025 | Aronhalt | G06K 17/0029 |
| 2025/0237561 | A1* | 7/2025 | Boswall-Perks | G01K 1/024 |
| 2026/0011237 | A1* | 1/2026 | Krejcarek | G08B 21/24 |

* cited by examiner

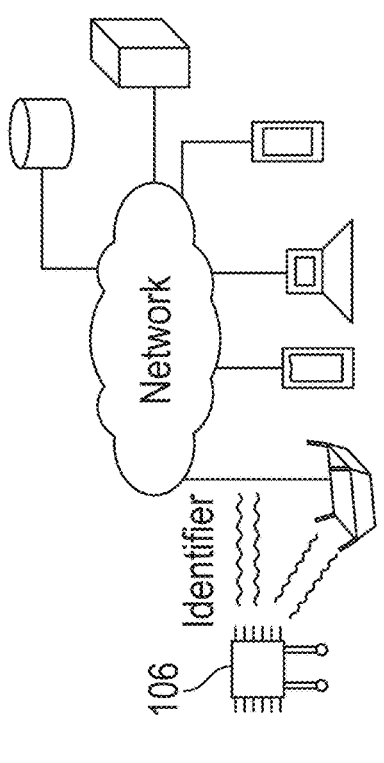
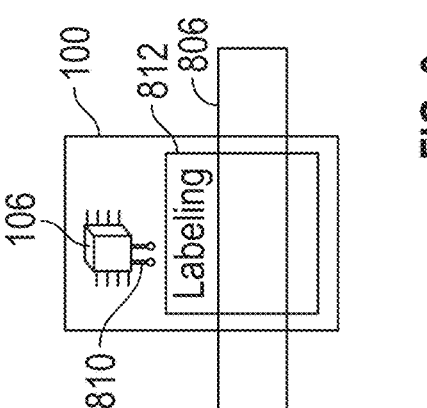
FIG. 8
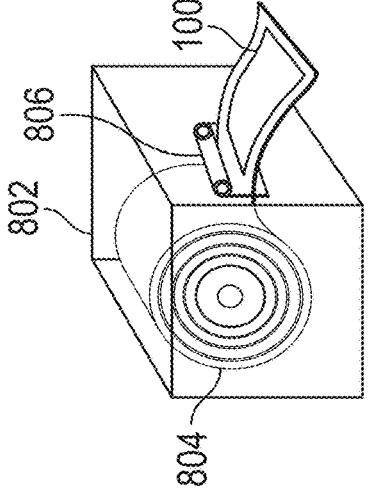

ULTRA THIN WIRELESS LABEL WITH IMPROVED TEMPERATURE-BASED OPERATIONS

CROSS-REFERENCE TO RELATED APPLICATIONS

This application is a continuation in part of U.S. patent application Ser. No. 18/416,666, filed on Jan. 18, 2024, which claims priority from U.S. Provisional Patent Application No. 63/438,845, filed on Jan. 13, 2023, and titled "THIN FILM WIRELESS LABEL WITH INTEGRATED TEMPERATURE SENSOR," the contents of all of which are hereby incorporated in their entirety and should be considered part of this disclosure.

BACKGROUND

Field

This invention relates generally to the field of thin film wireless labels and more particularly to ultrathin wireless labels with integrated temperature sensors.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Several applications in a modern economy can include tracking and shipment of items that may need to be kept at safe storage temperatures. Examples include pharmaceutical items and food items, whose temperatures are to be maintained within appropriate ranges to avoid spoilage. Traditional methods of monitoring the temperature of an object can benefit from advancements in the field of wireless label technology. For example, wireless labels can be attached to such items and provide continuous temperature monitoring of these items. At the same time, wireless labels need to conserve their battery power consumption to increase their longevity and accuracy (low battery can lead to low performance). Furthermore, wireless labels need to be calibrated to provide enough accuracy to be useful. Consequently, there is a need for wireless labels with continuous temperature monitoring capabilities and robust calibration techniques to make such wireless labels accurate.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIG. 8 illustrates a diagram of utilizing a printer to activate a wireless label.

DETAILED DESCRIPTION

Figure 1A:
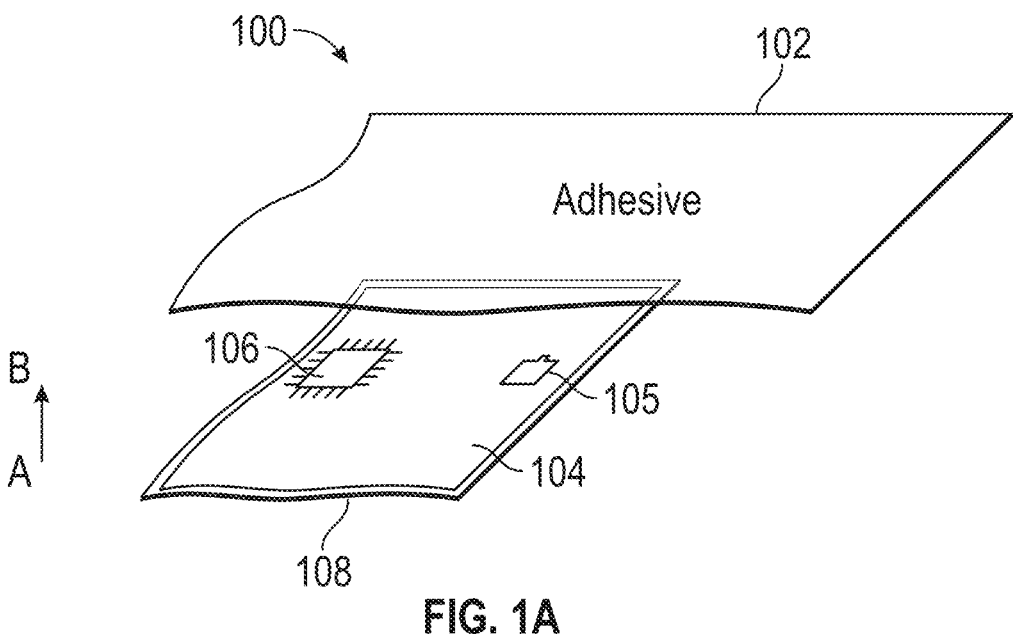
FIG. 1A illustrates a perspective view of the stacked layers of an example wireless label.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Monitoring and logging temperature is a primary function of track and trace devices for cold chain logistics applications. In many use cases for pharmaceutical and critical perishable goods, accurate temperature measurements with tolerances of +/−0.5° C. or better can be useful. This can be critical since temperature-sensitive inventory, for example, vaccines, blood, biological reagents, chemicals, or live cultures, can spoil or degrade if stored or transported for even short periods outside of a specific temperature window. In other applications, such as food transport and agriculture industry, out of range temperatures can cause spoilage and economic waste.

The current state of art for temperature sensing in a cold chain application includes temperature monitor devices (TMDs) that use microprocessor-based circuits, made on FR4 or flex polyamide circuit boards housed in rigid plastic enclosures. These devices typically employ a discrete temperature sensor, potentially with a digital interface to a microprocessor, or an analog interface in the case of a thermistor device. They can include a USB interface or a wireless interface such as NFC or Bluetooth.

Calibration is a necessary requirement for TMDs. Existing calibration methods can be cumbersome, time intensive, and introduce cost to manufacturing at any scale. For instance, for a class of TMDs, the fully assembled devices may need to undergo a process in which each device is stacked or arranged within an environmental chamber that exposes the device to known, pre-certified, calibration temperatures, such as 2° C., 5° C. or 8° C. This can involve manual effort loading the chamber, running the calibration sequence, unloading the chamber, unstacking, re-packing, and other cumbersome steps when performed for a large number of TMDs.

Since such environmental chambers typically circulate air and can have very low heat capacity, they can take a long time, known as the soak period, to calibrate devices. Since air movement can be restricted in many places around devices, a chamber can only allow for a limited number of devices, further adding reloading time and cost burdens to this calibration process. More significantly, the quality of calibration may also be affected by how the chamber is loaded. While +/−0.5° C. can be achieved, a growing number of applications demand even more accuracy in the calibration process, which can be difficult to achieve using the chamber-based calibration method.

In some cases, devices may incorporate pre-calibrated temperature sensors, but these are expensive, drastically increasing the cost of the device. Furthermore, the mechanical assembly, for example soldering or attachment to a PCB, can affect the calibration and accuracy of these devices, making the final device still uncalibrated. Furthermore, the housing of the device and how it is integrated with products or product packaging (e.g., cardboard boxes, Styrofoam, etc.) and whether the device is attached or incorporated on the inside or outside of the packaging can all be factors affecting the accuracy or deviation from a calibration point. Therefore, compared to pre-calibrated devices, performing calibration in the device's finished form can generally yield the best calibration results.

Other classes of TMDs can include semi-passive devices such as RFID or NFC-based TMDs and chemical indicators. The calibration embodiments described herein can be applicable and beneficial to these TMDs as well. For chemical indicators, temperature changes facilitate a chemical reaction that typically results in color change on a sensor medium. The described embodiments include a thin-film wireless label with an integrated temperature sensor and methods of calibration of that wireless label. The wireless label is included within a reel of similar wireless labels. The calibration process yields calibration parameters (e.g., calibration coefficients), which can be stored and used to derive accurate field temperatures when the wireless label is activated and used in the field.

Figure 2:
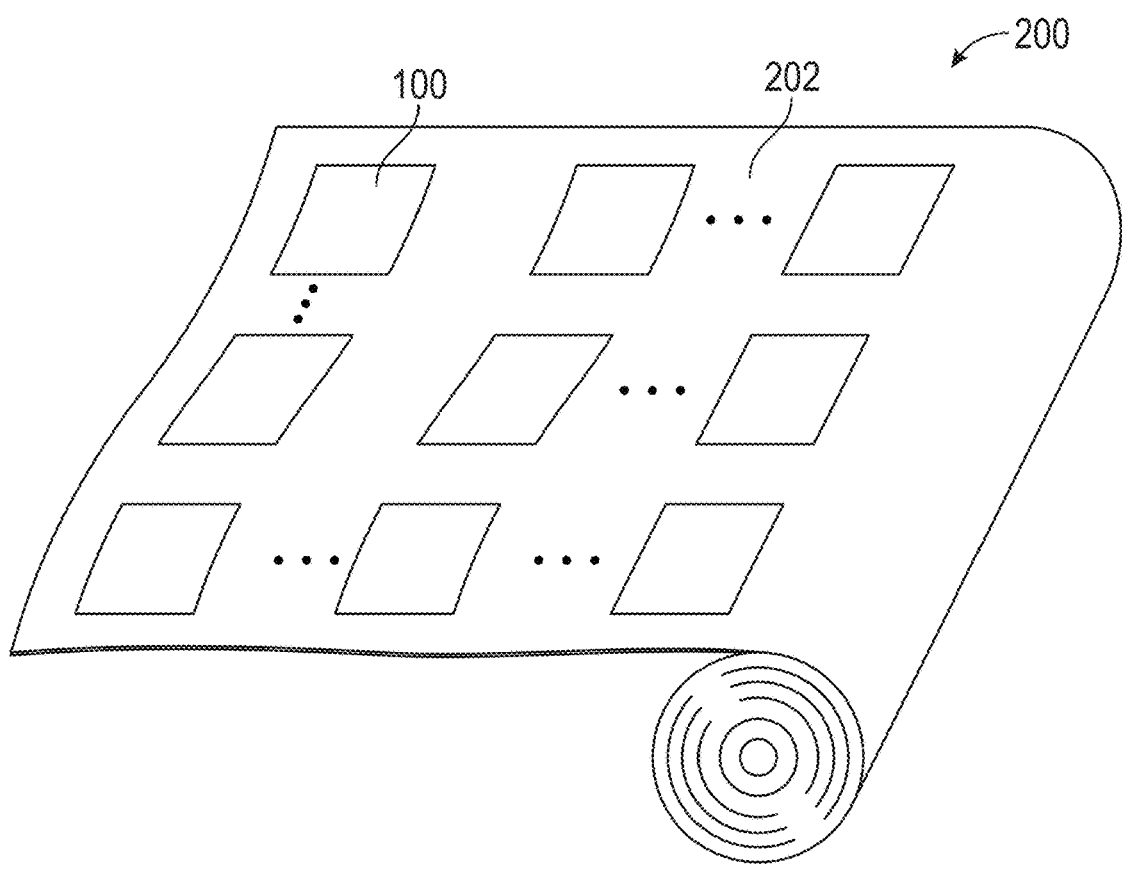
FIG. 2 illustrates an example reel of wireless labels.

FIG. 1A illustrates an example wireless label 100 and FIG. 2 illustrates an example reel 200 of the wireless labels 100. The reel 200 can include a plurality of wireless labels 100 arranged in rows and columns on a substrate 202. A user of the wireless label 100 can insert the reel 200 in a dispenser and/or a dispenser-printer combination device and print barcodes or other identifiers on a wireless label 100. In some embodiments, the dispenser-printer device can be a barcode or quick response (QR) code printer. In some applications, the dispenser-printer can be augmented with near-field communication readers, scanners and the like to activate the wireless label 100 and/or to communicate with the wireless label 100.

The wireless label 100 can use an ultra-thin construction. The wireless label 100 can be attached to various objects, inside or outside of packaging via an adhesive layer 102. The wireless label 100 can be a stack of ultrathin material, including for example, an interconnect layer 104, and an insulating layer 108. The insulating layer 108 can be fabricated from a foam-type material. The interconnect layer 104 can be an aluminum layer and can include a microcontroller 106 and an ultra-thin, coated or printed battery 105. The interconnect layer 104 can be fabricated from electrically and thermally conductive material, such as aluminum. The interconnect layer 104 can act as an electrically conductive substrate upon which electrical components can be fabricated. Consequently, the interconnect layer 104 can act as an interconnect between the electrical connections fabricated on the interconnect layer 104. In other words, the wireless label 100 can have a stacked layer, wherein the interconnect layer can act as a substrate and provide electrical connection between the plurality of the layers. For example, the microcontroller 106 and the battery 105 can be fabricated on the interconnect layer 104 and connected via the interconnect layer 104. Some examples of the wireless label 100 and details of those examples can be found in U.S. Pat. No. 10,964,197, entitled "LOW-POWER ELECTRONIC TAPE FOR TRACKING ITEMS," the contents of which are hereby incorporated in their entirety and should be considered a part of this disclosure.

The microcontroller 106 can include hardware and software capabilities to perform processing and wireless communication. For example, the microcontroller 106 can include an onboard processor, permanent and impermanent storage, communication circuitry, such as Bluetooth, radio frequency identification (RFID), and/or other wireless communication technologies. The microcontroller 106 can be programmed to provide various functionality for the wireless label 100. In some embodiments, the microcontroller 106 can be a system on chip (SOC) or a microcontroller unit (MCU). The microcontroller 100 can include a variety of internal subsystems. Examples of these systems can include, various wireless communication circuits, including Bluetooth and/or cellular components, analog to digital converters (ADCs), various sensors, including a temperature sensor, microprocessor systems for processing and/or generating sensor data and other subsystems, implemented in hardware and/or software. In other embodiments, some components and systems can be fabricated on the interconnect layer as components separate from the microcontroller 106. For example, in some embodiments, a temperature sensor, such as a thermistor, can be fabricated as a separate component of the wireless label 100.

The wireless label 100 can have two or more states. In an active state, the microcontroller 106 draws power from the battery 105 and performs selected or programmed functionality, for example, broadcasting data via a wireless network, such as Bluetooth, WiFi or cellular. The broadcast data can include an identifier of the wireless label (e.g., a media access control or MAC address and sensor readings). For example, in the active state, the wireless label 100 can broadcast temperature readings from a temperature sensor. The wireless label 100 can also be in hibernation state, where the microcontroller 106 does not source any current from the battery 105. In some embodiments, the wireless label 100 can be cycled through the active and hibernation states. For example, some described embodiments, include activating a wireless label, which can include waking up the microprocessor 106 from hibernation, performing temperature calibration operations to generate calibration parameters and deactivating the wireless label 100. In this manner, a wireless label 100 can be activated at the factory to generate temperature calibration parameters. Once those parameters are stored, the wireless label 100 can be placed back in hibernation state until a user reactivates the wireless label 100. The calibration parameters can then be used to obtain accurate or near accurate temperature readings from the raw temperature sensor data broadcast from the wireless label 100. In other embodiments, the wireless label 100 can broadcast calibrated temperature data in the field, as opposed to raw temperature data.

The wireless label 100 has a stacked structure that provides advantages when the wireless label 100 is used as a TMD. For example, FIG. 1A illustrates a perspective view of the stacked layers of the wireless label 100. From direction A to B, the wireless label 100 includes an insulating layer 108, an interconnect layer 104 and an adhesive layer 102. Not all layers of the wireless label 100 are shown. The layers illustrated are chosen to describe the wireless label 100 in relation to temperature monitoring functionality of the label.

Figure 1B:
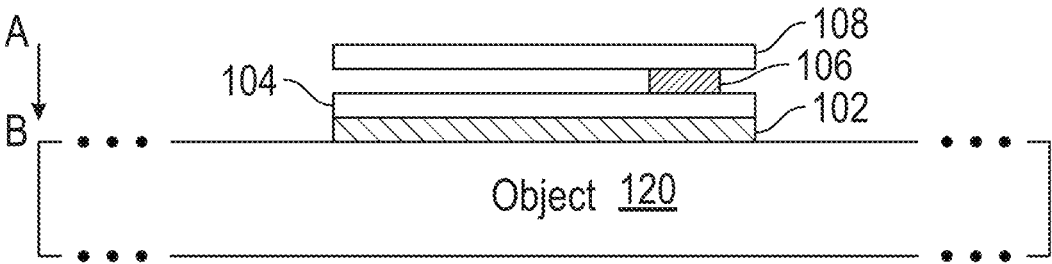
FIG. 1B illustrates a profile view of the wireless label attached to an object.

FIG. 1B illustrates a profile view of the wireless label 100 attached to an object 120. The wireless label 100 is attached to the object 120 via the adhesive layer 102. The adhesive layer 102 can be fabricated from thermally conductive material. In some embodiments, the adhesive layer 102 can be doped with metal particles to increase the efficiency of thermal contact between the object 120, the interconnect layer 104 and the microcontroller 106. However, a particle-filled adhesive layer is not a requirement in every embodiment, as the adhesive layer is thin-enough to allow for efficient thermal contact, even without the assisting particles. The interconnect layer 104 and the microcontroller 106 are thermally enclosed and/or insulated with the insulating layer 108. In this manner, the temperature sensor embedded in the microcontroller 106 experiences efficient thermal contact with the object 120, while being to some extent insulated from the environment of the object 120. While the embodiments will be described using the embedded temperature sensor of the microcontroller 106, this is not a requirement in every embodiment. Some wireless labels 100 can be fabricated with a discrete temperature sensor physically separate from the microcontroller 106.

FIG. 2 illustrates a reel 200 of wireless labels 100 fabricated on a substrate 202. Manufacturing the wireless labels 100 on a reel can allow various efficiencies in the life cycle of a wireless label. For example, for the purposes of temperature calibration, several labels can be calibrated at the same time. For item tracking applications, a customer can print on the wireless labels, detach them from the reel 200 and affix them to various items to track various parameters related to those items, including for example temperature.

The wireless label 100 can be manufactured where the microcontroller 106 is a silicon die bonded on a continuous moving film of aluminum-coated Polyethylene terephthalate (PET) substrate. In other words, the interconnect layer 104 can be constructed by coating an aluminum layer on a PET substrate. In the drawing, the PET layer is not shown; however, the interconnect layer can be built by coating an aluminum layer onto a PET layer. The embedded temperature sensor of the microcontroller 106 can be a relatively inexpensive method of providing a wireless label 100 with an on-board temperature sensor. In some cases the onboard temperature sensors can be relatively inaccurate, without calibration.

An efficient method of performing calibration for the wireless labels 100 of the reel 200 can include exposing the labels to known temperatures, obtaining sensor temperature readings and generating temperature calibration parameters. The calibration parameters can be stored. When a wireless label 100 is activated and used in the field, the parameters can be used to convert the raw temperature sensor readings to a more accurate measure of the field temperature the wireless label 100 is experiencing.

Figure 3:
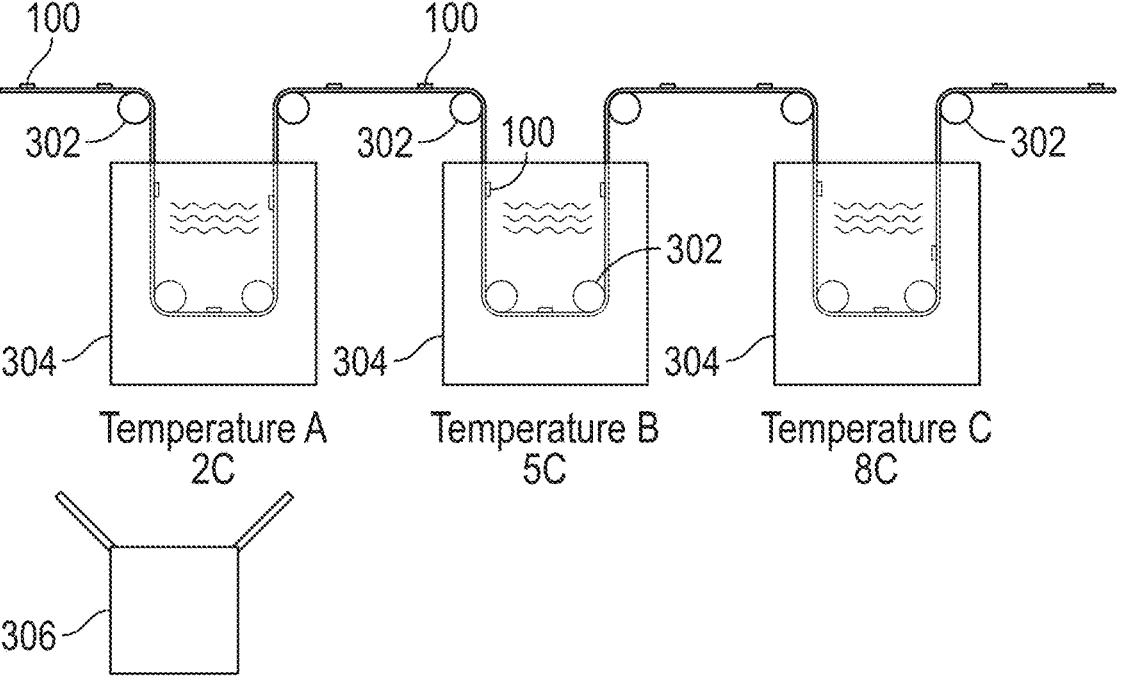
FIG. 3 illustrates a setup for a calibration method using thermal baths.

FIG. 3 illustrates a setup for a calibration method using thermal baths. More specifically, the example shown in FIG. 3 illustrates the setup for a three-point calibration technique, using three thermal baths. However, fewer or more thermal baths can be used for calibration. Calibration in this context refers to a process of obtaining raw temperature readings from the temperature sensor of a wireless label in a known temperature environment of a thermal bath to generate calibration parameters, which can be used to later convert field temperature readings of a wireless label to accurate or near-accurate temperature readings.

In the example shown, the thermal baths are at 2° C., 5° C. and 8° C. The temperatures of the thermal baths can depend on the range of temperatures in which the wireless labels 100 are expected to be operating. Typically, for a three-point calibration, two values near the borders of an expected range and one value near the middle of the range of expected operating temperatures are chosen to perform calibration. For example, if the wireless label 100 is expected to operate in 0° C. to 10° C., the calibration temperatures can be chosen as illustrated in the example shown in FIG. 3 (e.g., 2° C., 5° C. and 8° C.).

To perform calibration and obtain calibration parameters, a reel 200 of wireless labels 100 can be unrolled and moved in a web through a plurality of rollers 302. The rollers 302 catch, rotate and unwind the reel 200 to submerge the wireless labels 100 in the thermal baths 304. The rollers 302 in combination with motors can move the labels 100 from one calibration thermal bath 304 to the next. Before the labels are exposed to known temperatures, the labels are activated. The activated labels begin broadcasting various data, including their identifier and their respective temperature sensor readings. An antenna or receiver 306, placed in or near the thermal baths can be used to receive the broadcast data from each label as they are exposed to the known temperatures of the thermal baths. In some embodiments, a plurality of receivers 306 can be used. For example, in one implementation, a receiver 306 can be placed near or under each thermal bath 304. The receiver 306 can include communication circuitry corresponding the communication circuitry of the microcontroller 106, for example, RFID, Bluetooth, or others. The receiver 306 can be connected to a computer system, or additional components, for storage and processing of the sensor data received from the wireless labels 100. In some embodiments, one multiple wireless labels 100 are submerged in a thermal bath, each wireless label can broadcast an identifier of the wireless label in addition to temperature sensor data. In this manner the receiver 306 and/or the downstream processing computer system can distinguish or track the temperature sensor data of each label. When calibration is concluded, the labels are deactivated, and the reel 200 is rewound or rerolled again. The reel 200 can then be shipped to users. When a user activates a label 200, stored calibration parameters can be used to convert raw temperature readings to accurate or near-accurate temperatures.

Various fluids can be used in the thermal baths 304. Examples include water, distilled water, deionized water, a hydrofluoric solution, or other fluids. In some embodiments, wireless labels 100 can be coated in a waterproofing layer to prevent or minimize risk of corrosion.

An alternative method of calibration includes bringing the temperature sensors into contact with sets of thermodes at different temperatures, along with pre-calibrated platinum resistance thermistors alongside the microcontroller 106. In this method of calibration, the web of wireless labels 100 are moved beneath one or more sets of temperature-controlled thermode stations. Raw temperature measurements of the labels are captured, by for example, by receiving Bluetooth packets from the labels with raw temperature measurement data. In addition, high-accuracy measurements of the actual temperature experienced by the labels are also captured, using a pre-calibrated platinum resistance thermistor.

A variety of algorithms can be used to generate the calibration parameters from the raw temperature readings against the controlled temperatures of the thermal baths or thermodes. For example, one method includes obtaining raw temperatures and voltage ADC values from the submerged wireless labels 100 along with the known temperature values from high accuracy temperature probes in-situ in the thermal baths or on the thermodes; cleaning the raw data to remove anomalies outside of allowed range in temperature and voltage (e.g. temperature reading anomalies caused when the label is first switched on, or the label hasn't fully adjusted to the ambient temperature of the fluid in the thermal bath or the thermode); running a multi-dimensional linear regression of the raw data and the known temperature using a least squares linear regression; fitting a linear model with coefficients that minimize the residual sum of squares between the observed targets in the dataset and the targets predicted by the linear approximation; obtaining calibration coefficients; and intercepting values from the linear regression.

The above-algorithm yields calibration coefficients, which can be stored in a server in the cloud and/or in the label. When the label is deployed in the field, the label can broadcast raw temperature readings, which can be converted to accurate temperature readings using the coefficients stored in the cloud, or alternatively, the label can perform the conversion onboard and broadcast accurate temperature readings.

Figure 4:
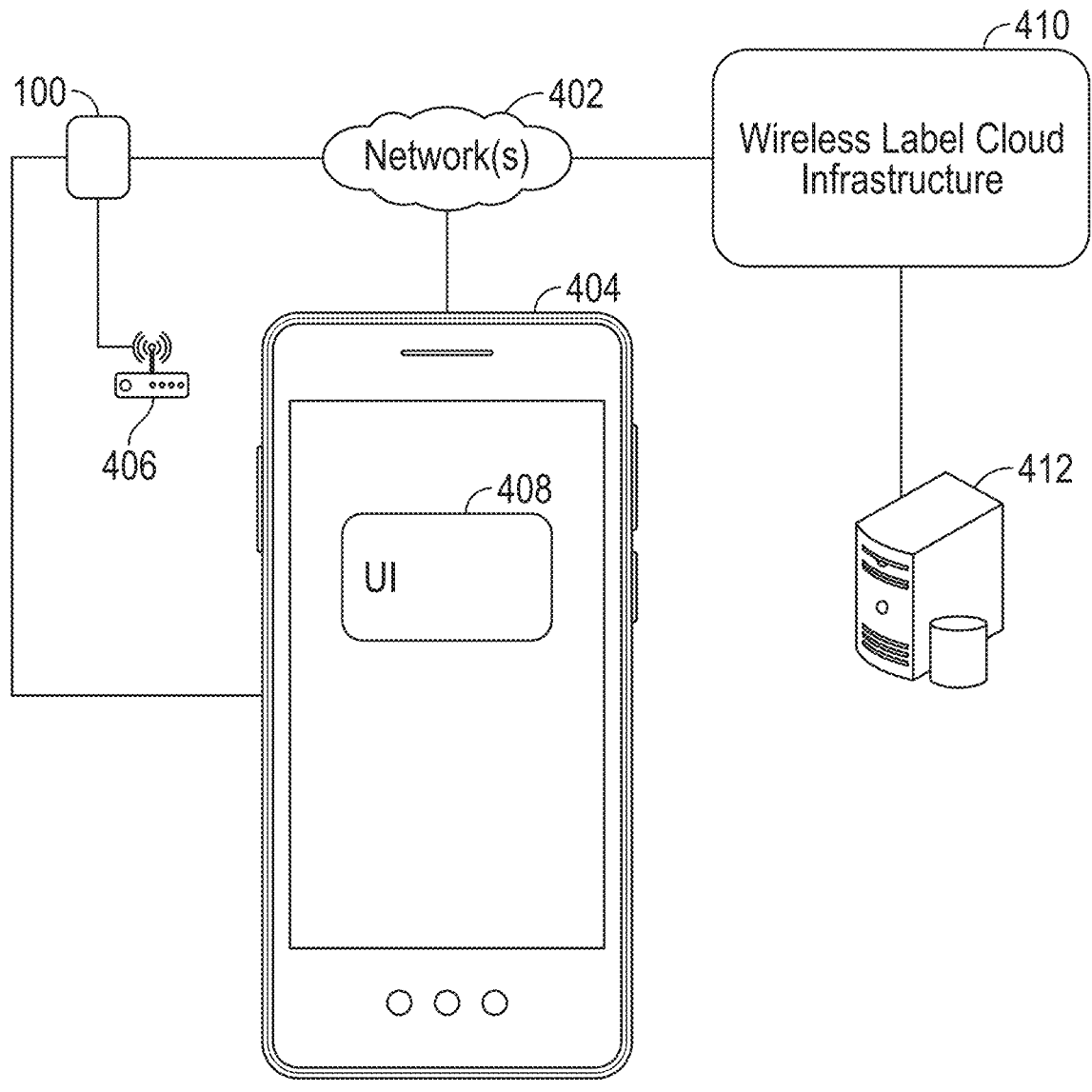
FIG. 4 illustrates an environment in which a wireless label can be used.

FIG. 4 illustrates an environment in which the wireless label 100 can be used. The wireless label 100 can be shipped to a customer as part of a reel 200 of wireless labels 100. A user can activate a wireless label 100. The wireless label 100 can be in wireless communication via a network 402. The network 402 can include a variety of local and/or over-the-Internet networks, and can include subsidiary networks. For example, the wireless label 100 can be in wireless communication with a network via one or more gateways 406. The wireless label 100 can also be in wireless communication via Bluetooth and/or cellular network with devices 404. Example devices 404 include smart phones, smart tablets, laptops, desktops, and/or other computer devices. The devices 404 can also be in turn in communication with one or more networks, including the Internet, and/or a cloud infrastructure. In some embodiments, the wireless label 100 can be locally in wireless communication with devices 404, gateways 406, via WiFi, Bluetooth, cellular network, or other wireless networks. Those local networks can in turn be connected to other networks, for example the Internet and/or a cloud infrastructure. In some embodiments, the wireless label 100 can be in communication with a wireless label cloud infrastructure 410 via the network 402. The cloud infrastructure 410 can include one or more server 412 for providing various off-the-label processing and functionality for the wireless labels 100. For example, the infrastructure 410 can generate user interface (UI) 408 on devices 404. A user of the wireless 100 can access the various functionality of the wireless label 100 via the UI 408.

In some embodiments, the calibration parameters, such as calibration coefficients can be stored in the server 412 along with an identifier of a wireless label 100 to which the calibration parameters relate. An activated wireless label 100 can send temperature readings to the cloud infrastructure 410 along with the identifier of the wireless label 100 via the network 402. The cloud infrastructure 410 can access the stored calibration parameters for the wireless label 100, for example, via a look-up table (LUT). The stored calibration parameters can be used to generate accurate temperature readings from the received raw temperature readings of a wireless label 100. In other embodiments, the calibration parameters can be stored in the wireless label 100, where the wireless label 100 generates the accurate temperatures from the locally stored calibration parameters and transmits them, for example, to the UI 408. The accurate temperature readings whether provided via the cloud infrastructure 410 or the wireless label 100 can become the basis for various actions, such as generating notifications, alarms or any other functionality that depends on the temperature monitoring functionality of the wireless label 100.

In some embodiments, the wireless label 100 can utilize the temperature monitoring functionality to enhance the performance of the wireless label 100. For example, the temperature monitoring capability of a wireless label 100 can be used for switching the label into active or hibernation, depending on the detected temperatures, thereby increasing the longevity of the battery 105. Furthermore, battery performance in colder environments deteriorates. In other words, the battery 105 can wear out faster when it operates in colder temperatures. The wireless label 100 can limit the rate of broadcasting of its data payload based on detecting a low temperature below a selected threshold. The wireless label 100 can, therefore, conserve battery life and avoid interruptions in broadcasting in colder environments by reducing the load on the battery.

Further Examples of Calibration

An example microcontroller 106 can be a DA1453x produced by Renesas Electronics of San Diego, California (408)284-8420. The microcontroller 106 can contain a built-in temperature sensor with a single point calibration value present in one-time programmable (OTP) format, determined during production. Accuracy of the calibration process can be related to the various aspects of the production environment. An example value of the obtained accuracy can be between −4 and +4° C.

In some embodiments, the labels can have two modes of temperature data transmission. The first is via Bluetooth low energy (BLE) beacons, which can send periodic advertisement packets that include the instantaneous battery voltage as well as multi-sampled raw temperature sensor analog to digital converter (ADC) values. The second is via connecting to a device 404 as a Bluetooth peripheral, wherein the device 404 can download historical battery levels and raw temperature ADC values.

The temperature sensor can have sensitivity to its supply voltage, VBAT_LOW. As an example, characterization measurements can show the following behavior: average=−0.2° C./V and Sigma=0.84° C./V. Calibration can also yield a temperature reading within a selected example target range (e.g., ±0.5° C.), accounting for variation in supply voltage.

Example Calibration Steps

Step 1—The relationship between ambient temperature, supply voltage and temperature sensor output are determined. For example, a Bluetooth chip can report the supply voltage (VBAT_LOW) and the ADC value of the built-in temperature sensor (T_ADC).

Figure 5:
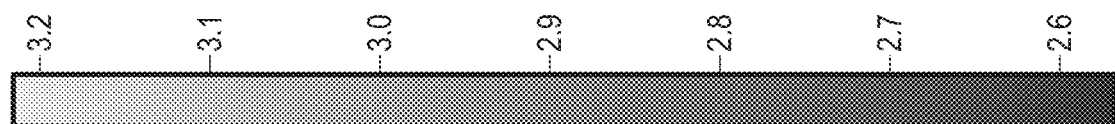
FIG. 5 illustrates empirical results showing approximately a linear relationship between supply voltage, raw temperature sensor readings, and the ambient temperature.

Using a Fluke Hart Scientific 7103 temperature bath (resolution 0.01° C. and Stability to ±0.015° C.) and silicone oil, data can be obtained for both VBAT_LOW and T_ADC for a sample of 6 wireless labels, across a temperature range of –10° C. to 50° C. (in 1° C. increments) and a voltage range of 1.1V to 3.2V (in 0.1V increments). The obtained data can show that the relationship between VBAT_LOW, T_ADC and the actual ambient temperature (T_AMBIENT) within the operational range of the labels can be approximated to be linear, with coefficients of determination (R-squared) values averaging 0.9999. FIG. 5 illustrates empirical results showing linear relationship between VBAT_LOW, T_ADC and T_AMBIENT for "6" test wireless labels 100.

The linear relationship between VBAT_LOW, T_ADC and T_AMBIENT can also be shown to be unique to each label. Therefore, each label can require an individual calibration for both VBAT_LOW and T_ADC in order to achieve temperature accuracy within the target range.

Step 2—Calibration Equation

Since the relationship between VBAT_LOW, T_ADC and T_AMBIENT can be linear, the relationship can be expressed as a linear equation. Equation (1) expresses an example linear relationship, which can be used to derive an ambient temperature experienced by a label (T_Label)

$$T_{Label} = VBat_{low} * Bat_{coef} + T_{ADC} * T_{ceof} + T_{intercept} \qquad \text{Equation (1)}$$

To obtain the coefficient values ($Bat_{coef}$ and $T_{ceof}$) and the intercept value ($T_{intercept}$) a two-point calibration of two temperatures and two supply voltages can be used. To reduce uncertainty and improve accuracy further, a third calibration point can be used to obtain a triple-point calibration method.

Step 3—Calibration Methodology

During manufacturing each label can be exposed to two different temperatures (T_ambient), and at each temperature to two different supply voltages to obtain 4 datasets (Low-Temp_LowVoltage, LowTemp_HighVoltage, HighTemp_LowVoltage and HighTemp_HighVoltage). A linear regression can be performed on these datasets to determine the two calibration coefficients and the temperature intercept value. These coefficients and intercept values can be stored in the cloud for each label.

Step 4—Calculating Temperature in Use

When temperature labels are used in production, the Bluetooth beacon can contain the T_ADC and VBAT_LOW value (oversampled to reduce error). This beacon can be received, by for example, a mobile device, a cellular and/or Wi-Fi gateway, and the data can be transmitted to the cloud infrastructure 410. Using the calibration coefficients and intercept values, the calibration calculation, Equation (1), is used to determine the ambient temperature that the label is experiencing.

Example Applications

An additional benefit of the wireless label 100 includes integration in the logistics and supply chain tracking capabilities of an inventory infrastructure. When shipments depart or arrive at facilities that comprise logistics supply chain routes, networked data gateways (e.g., Wi-Fi and cellular) listen for signals from the labels. If the labels are temperature enabled, the gateway devices, connect to the labels, via Bluetooth or other wireless connections, and download the raw temperature and battery level data, sending the data the cloud infrastructure for processing and transformation to accurate temperature values. These data gateways communicate to the cloud the timestamps transmitted by the labels, to determine whether data for a specific label has already been downloaded, and whether to carry out the download.

Another mode of operation is where the temperature tracking for specific labels can be wirelessly started and stopped, or the period of historical storage updated, by the network of data gateways via bi-directional Bluetooth connections, enabling data to be stored for periods of interest only, elongating the historical storage capacity as well as the battery life of the labels.

When the battery level and raw temperature data arrive in the cloud infrastructure, they are transformed into accurate temperature values which are associated with the item the label is tracking. The link between the item and the label can be formed when the label is activated. Workflows, configured in the cloud, can define temperature threshold limits and rules on which actions to perform, if excursions from these thresholds are detected. This can result in timely and automated alerts and notifications, as well as other outputs which can include generating custom-templated PDF reports, emailed to users or customers, machine-to-machine messaging via application programming interface (API) webhooks, message busses, and/or pub/sub systems, as well as triggering further workflows. The triggers can include temperature thresholds, temporal schedules, as well as geofence locations and specific zones within supply-chain journeys. An example application would be a temperature data report for a shipment of vaccines, detailing the start time and end time, route of the journey, timeline of temperature levels, any excursions outside of the desired temperature range and a score indicating how normal this journey has been compared to the customer's other journeys and benchmarked against other similar journeys by other customers.

In another aspect, the wireless labels can include a thin film printed, or coated Zn—Mn battery. At lower temperatures, batteries have reduced capabilities to deliver power to their attached circuitry. Therefore, a method to conserve power is to rate-limit the beaconing of the device based on how quickly the temperature changes. A steady temperature may only require hourly updates, conserving energy. At lower temperatures, typically below 0° C., the update rate is further reduced to 6 hours, for instance. But if the temperature is quickly rising, then the label is configured to more rapidly send beacon updates.

Ultrathin wireless labels, such as the wireless label 100, can benefit from techniques to save battery life and increase the label's useful life. In some implementations of the wireless label 100 monitoring the temperature of the wireless label and/or the environment of the wireless label can be the basis of some battery saving techniques. For example, the wireless label 100 can change its beaconing frequency based on the monitored temperature. The wireless label 100 can also cycle between the activation or hibernation states, based on the monitored temperature. In some implementations, the wireless label can store or otherwise have access to a temperature configuration file, corresponding to an item or a collection of items to which the label is affixed or otherwise associated. For example, wireless labels 100 can be used in shipment and storage of pharmaceuticals, foods, or other items, for which safe storage may require the items to be maintained within a specified range of temperatures. For example, some fresh fruit and vegetables are optimally stored at a range between 0 to 13 degrees Celsius. Some pharmaceuticals need to be stored at temperatures below zero degree Celsius.

In some embodiments, the wireless label 100 can be connectable and configurable, based on a temperature parameter. For example, a wireless label 100 can change the frequency of sending connectable beacons, based on sensing a temperature of the label and/or the environment of the label. The beaconing frequency of the wireless label can be dynamically adjusted, based on input from an integrated temperature sensor, monitoring the temperature of the wireless label, relative to the operating temperature parameters, specified in the configuration file.

Negative Temperature Control

Low temperatures, for example temperatures below zero degree Celsius, can have a negative impact on the performance of all batteries, including the integrated batteries of the wireless labels 100. Nonetheless, in some applications, the wireless label 100 may be deployed to monitor temperatures, where the temperature of the environment of the wireless label 100 may drop below zero degrees Celsius, negatively impacting the performance of the wireless label 100. Wireless label 100, in some implementations, can use a polling technique to obtain temperature readings and perform temperature monitoring. Temperature monitoring when the wireless label 100 is in a subzero environment can be inaccurate and can unnecessarily drain the integrated battery.

For some items, the wireless label 100 may be configured to monitor the temperature of an item and broadcast a warning if the monitored temperature is detected to be outside a selected range. In some implementations, the wireless label 100 can be configured to execute a thermal shutdown event, by reducing the activities of the microcontroller 106, when a subzero temperature is detected. For example, when monitored temperature approaches zero, the frequency of temperature polling can be reduced, until a higher temperature is detected. In applications where the wireless label 100 is deployed to monitor the temperature of refrigerated items, reducing the temperature polling of the microcontroller 106 can substantially improve the battery life of the wireless label 100, as such items can be in a refrigerator unit for long periods of time. When a higher temperature is detected, more activities of the wireless label 100 can be restored. For example, higher frequency temperature polling can be restored.

Temperature-Based Power Consumption Modulation

Wireless label 100 can modulate its power consumption, based on a customizable temperature parameter. For example, when the wireless label 100 is monitoring the temperature of a refrigerated item, the microcontroller beaconing frequency can be reduced during the time when the monitored temperature indicates the item is still in the refrigerator. When the item is moved out of the refrigerator, there can be a drastic change in the monitored temperature, indicating to the microcontroller that it can increase its connection beaconing frequency. Similar temperature fluctuations can be detected when the shipped item and its wireless label 100 change locations, for example, from the delivery vehicle to a destination premise.

Temperature-Based Item Locator Using Wireless Labels

In some embodiments, the wireless label 100 can detect an open box event, corresponding to a drastic and sudden fluctuation in the monitored temperature. The wireless labels can also use temperature monitoring to find a corresponding change in an item's location. In this scenario, the rate of change of the monitored temperature can indicate whether the item has been moved from its prior location, or whether the items has remained in its prior location.

Connectable and Configurable Wireless Labels

The wireless labels 100 can be configured with one or more temperature behavior profiles, including profiles that outline negative temperature control, and temperature-based power consumption modulation behavior of the wireless labels. These temperature behavior profiles can be stored in a wireless label 100, hardcoded therein, or can be externally accessible to the microcontroller 106. In some embodiments, the microcontroller 106 can include an integrated permanent memory, which can be used to store the temperature profiles. The temperature profiles can be editable profiles, having maps or a table of one or more selected microcontroller actions, corresponding to a detected temperature or a temperature range. When the wireless labels 100 are used in field applications, the microcontroller 106 can receive a temperature reading from a temperature sensor, integrated in the microcontroller, or as a separate component of the wireless label 100. The microcontroller 106 can look up an action or a series of actions from a corresponding profile of the detected temperature and perform those actions. Some example actions can include modulating the beaconing frequency of the microcontroller, modifying the temperature polling frequency, and transitioning the state of the microcontroller to hibernation or active state.

In some implementations of the wireless labels 100, several wireless labels 100 can be in wireless communication with a gateway or an access point device, several meters away from the wireless labels 100. A substantial portion of the wireless label battery power can be drawn, communicating with the gateway. In some embodiments, to conserve battery power, several wireless labels, positioned nearby to one another, can be grouped together, where a first group of wireless labels can be primary labels, while the remaining wireless labels in the group can be secondary labels. The secondary labels transmit their signals and communicate with one or more of the primary labels, as opposed to the gateway. The primary labels relay the signals from the secondary labels to the gateway. In this manner, only a selection of the wireless labels, spend the higher energy required to transmit to a far away gateway, while the remaining wireless labels, conserve their energy, by only transmitting signals to a relatively close primary label. In some embodiments, the primary and secondary roles can be cycled and/or reassigned to distribute the power consumption among a plurality of the labels. In other embodiments, the primary labels can be more robust or have more integrated battery storage capacity to offset the extra load from transmitting for several secondary labels to the gateway.

Temperature-Based Open-Box Detection, Using Wireless Labels

In several industries and applications, it can be desirable to detect whether a box has remained sealed or has been opened. Temperature-sensor-enabled wireless labels 100 can be used to detect an open-box. In some scenarios, if a box is sealed, changes in the environment of the box can cause gradual changes in the temperature sensed by a wireless label 100 inside the box. On the other hand, if a box has been opened, the inside temperature of the box is more readily exposed to the outside environment temperature fluctuations, registering the temperature change at a relatively more increased rate, compared to the closed-box scenario. A wireless label 100, placed inside the box, can detect the increased rate of temperature fluctuation, and thereby detect an open-box event. In these scenarios, the wireless label can store corresponding thresholds, depending on expected field temperature, to register an open-box event.

Resistance-Based Open-Box Detection, Using Wireless Labels

In some embodiments, a wireless label can be constructed in a stacked layer architecture, by layering one or more insulating and conductive substrates. The layers can exhibit different resistance values, when the layers are bent, stretched, torn, or otherwise experience a physical change. A change in the resistance of a layer can correspond to an open box event. A wireless label can be affixed to a box, such that when the box is opened, one or more layers can change orientation, and a corresponding change in resistance can occur. The wireless label 100 can detect the change in resistance and flag it as an open-box event.

Figure 6:
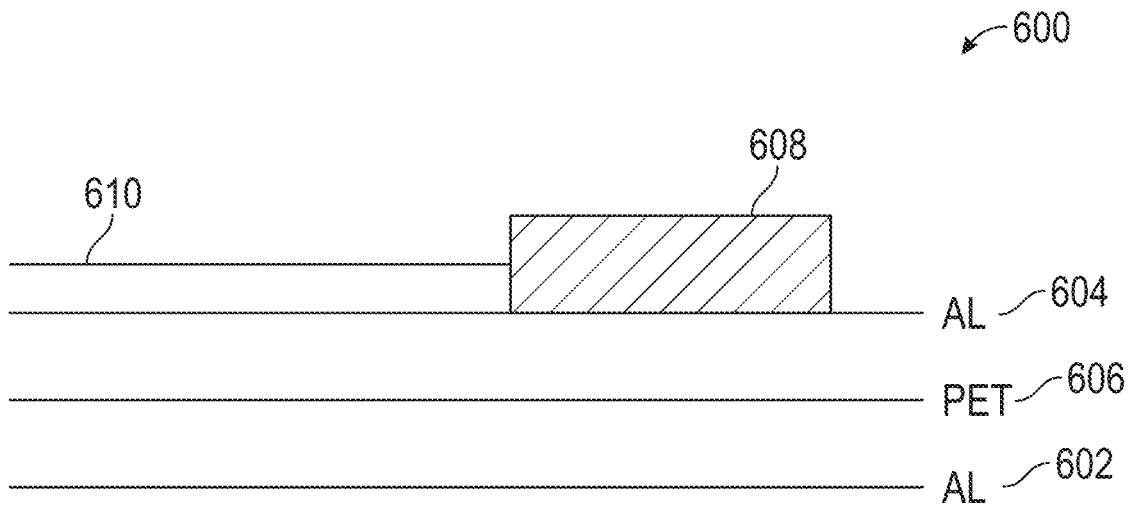
FIG. 6 illustrates an example diagram of the stacked architecture of an ultrathin wireless label.

FIG. 6 illustrates an example diagram of the stacked architecture of an ultrathin wireless label 600. Not all layers and components are shown. Wireless label 600 is similar to the wireless label 100. In one implementation, two aluminum layers 602, 604, sandwich a PET layer 606, with a microprocessor 608 bonded on one of the aluminum layers, for example, aluminum layer 604. The layer 604 can be similar to the interconnect layer, having a microcontroller 608 bonded thereon. Alternatively, the layer 604 can be a separate layer than the interconnect layer, but with connection to the microcontroller layer 608. In some embodiments, the aluminum layer 604 can be coated by another conductive layer 610, such as carbon. The microcontroller 608 can detect a change in the electrical resistance of a selected layer of the wireless label 600. For example, the microcontroller 608 can detect the change of resistance of the carbon-coated aluminum layers 604, 610, when the wireless label 600 is stretched, bent, or otherwise undergoes a physical change to its shape or orientation. The addition of a coating, such as a carbon layer is optional. The microcontroller 608 can measure the change in resistance of an uncoated layer too. The conductive coated layer, or having a conductive coated layer, within the stacked architecture of the wireless label 600 can increase the efficiency of measuring a resistance value within the wireless label 600 corresponding to an open-box event.

Figure 7:
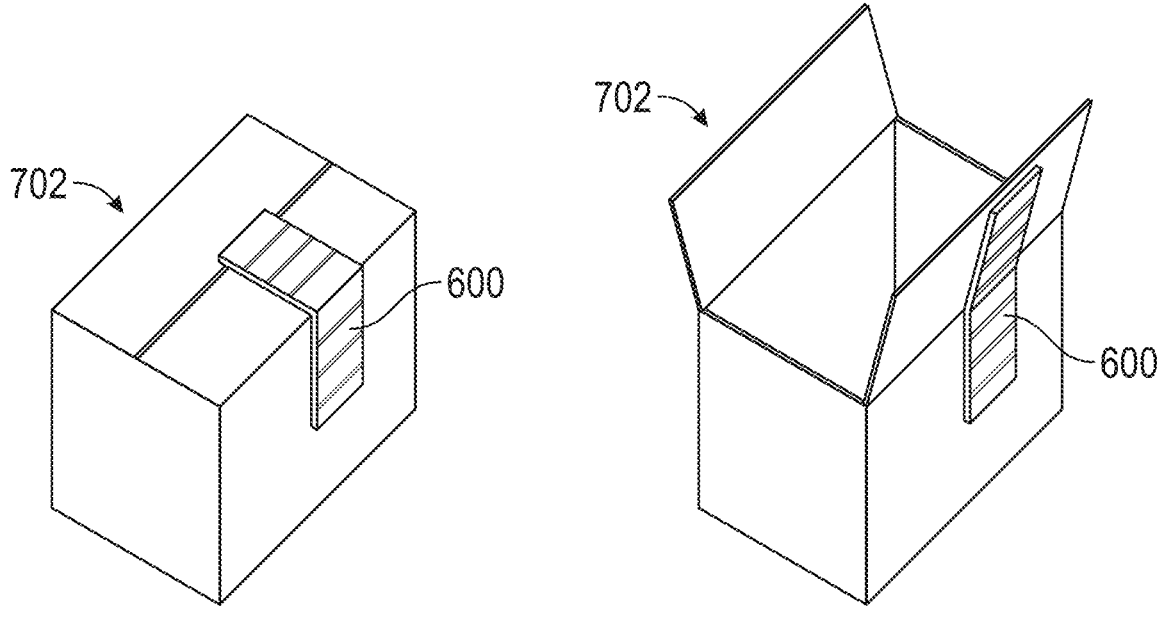
FIG. 7 illustrates a wireless label, used for detecting an open-box event, using a resistance-based approach.

FIG. 7 illustrates a wireless label 600, used for detecting an open-box event, using a resistance-based approach. The wireless label 600 can be attached to an inside or outside of the box 702. The wireless label 600 can be adhered to the box 702 in an orientation, such that opening the box 702 can cause a physical change in the wireless label 600. For example, opening the box 702 can straighten the label from a bent orientation, or it can bend the wireless label 600 in another direction. In this manner, the wireless label 600 can be affixed inside or outside the box 702 on any surfaces whose orientation can change when the box 702 is opened, causing the wireless label 600 to change orientation too. In FIG. 7 wireless label 600 is shown adhered to the outside of the box 702.

The wireless label 600 can be calibrated by measuring and recording a reference resistance for a selected layer of the wireless label 600. As an example, when the wireless label 600 is first affixed to the box 702, a resistance of a carbon coated layer 604, 610 can be measured and stored in a memory of the wireless label 100 as a reference point, assigned to the closed-box status of the wireless label 600. When the box is opened, the change in resistance can be compared against the calibration, closed-box reference resistance. A change in resistance can indicate a change in the location, orientation and/or placement of the wireless label 600, relative to its prior position, which can indicate an open-box event. Measuring the resistance of a layer can be performed by programming the microcontroller 106 to apply a voltage to a layer of the wireless label via a general-purpose input/output (GPIO) port of the microcontroller 106, and to measure the current received from that layer as a result of applying the voltage. The microcontroller 106 can determine the resistance of the layer, based on the detected current value and the applied voltage value, using Ohm law, or other techniques.

In some embodiments, where a microcontroller of the wireless label performs storage, and processing of various sensed data, such storage and processing can be optionally performed in an external computer system, for example via a cloud architecture. In other words, some embodiments of the wireless label can utilize their communication capability to perform off-chip storage and processing. Some advantage of off-chip storage and processing can include greater conservation of the limited battery resources of an individual wireless label, as well as an ability to utilize more sophisticated and/or efficient computing resources of an off-chip system, such as a cloud infrastructure.

Activating a Wireless Label During the Printing Process

The wireless labels 100 are manufactured and stored in reels, and are put in hibernation state. During hibernation, the microcontroller of the wireless label is in inactive mode, not using substantial battery power, or minimally using battery for select functionality. During hibernation, or inactive state, the wireless label also does not emit any connection signals or beacons. The ultrathin form factor of the wireless labels can allow them to be used in standard industrial printers. For example, a reel of wireless labels 100 can be placed inside a label printer, such as those manufactured by Sato, for instance, the CLNX4. Such printers can print on a wireless label, as they would on any other thin label, such as those made of paper and/or cardboard material. In some embodiments, the wireless label 100 can include a thin paper layer onto which a standard industrial printer can print a barcode, a QR code, text, graphics or any other type of information.

Printers can typically include a printhead, which in part operates by heating a print medium, for example, a wireless label 100, to a few hundred degrees Celsius. For example, some printheads can heat a wireless label to approximately 300 degrees Celsius. However, the medium is only exposed to this high temperature for a very short duration of time, for example, a fraction of a second, and only in very limited locations on the medium, typically corresponding to the locations of the pixels to be printed. Therefore, the relatively delicate medium material does not melt because of the limited exposure to the high temperature of the printhead. At the same time, the exposure is enough to make an impression and to print pixels on the medium.

FIG. 8 illustrates a diagram of utilizing a printer 802 to activate a wireless label 100. The printer 802 can have a printhead 806. A reel 804 of wireless labels 100 can be inserted in the printer 802. The printer 802 unwinds the reel 804 and prints on a wireless label 100. The printing process includes the printhead 806 reaching a selected temperature, at which the printhead 806 can make an impression on a print medium, such as a wireless label 100. The printing process and the heated printhead 806 can generate a voltage and/or current on the wireless label 100. The voltage and/or current, generated due to the operation of the printhead 806, including the momentary increase in the temperature of a pixel or a group of pixels on the wireless label 100, can be registered at a selected port of the microcontroller 106, causing the microcontroller 106 to activate, and begin sending connection beacons, or to perform other functions. In some embodiments, the microcontroller 106 includes an input port/output port (IPOP) 810 dedicated to waking up the microcontroller from hibernation stage. The IPOP 810 can be a general-purpose input/output (GPIO) port. A voltage applied to the IPOP 810 from the printing process can wake up the microcontroller 106 from the hibernation state. The connection beacons, emitted from the microcontroller 106, can include an identifier of the wireless label 100. The identifier can be a Bluetooth identifier, a chip identifier, or any other type of identifier that uniquely identifies the microcontroller 106, and by extension, its wireless label 100.

In one embodiment, the printing process on a wireless label 100 can be performed in a manner that allows for printing a text or graphics label on the wireless label 100, activating the microcontroller of the wireless label 100, and associating the identifier of the microcontroller with an item. For example, the printer 802 can move the wireless label 100, relative to the printhead 806, as the printhead 806 heats up and prints pixels on the wireless label 100. The pixels can correspond to text, or graphics selected to be printed on the wireless label 100. For example, the printhead 806 can print a QR code, a barcode, a textbox or similar labeling 812 on the wireless label 100. During the printing of the labeling 812, the printhead 806 can generate a voltage in the wireless label 100, which can be register at the IPOP 810 of the microcontroller 106, causing the microcontroller 106 to activate from the hibernation state and begin broadcasting a connection beacon, and/or to start performing other selected functions. The connection beacon can include an identifier of the microcontroller 106. The broadcasted identifier can be received by a variety of computer and/or networking devices, including for example, gateways, smartphones, tablets, laptops, desktops, servers, a cloud infrastructure, or others. These computer and networking systems can associate the identifier with an item to tracked. In some applications, the wireless label 100 can also be affixed or attached to the associated tracked item. In some embodiments, the signals emitted by the microcontroller 106 can be received by other wireless labels 100, which can act as relay and/or communication endpoint for the microcontroller 106.

In some embodiments, the wireless label 100 includes a thermocouple layer to more efficiently generate a voltage from the heat received from the printhead. A thermocouple layer includes two dissimilar conductive layers that are coated or deposited onto one another. The two dissimilar conductive layers, when exposed to heat from the printhead 806, can generate a voltage, which can in turn activate the microcontroller 106.

Figures 9, 10:
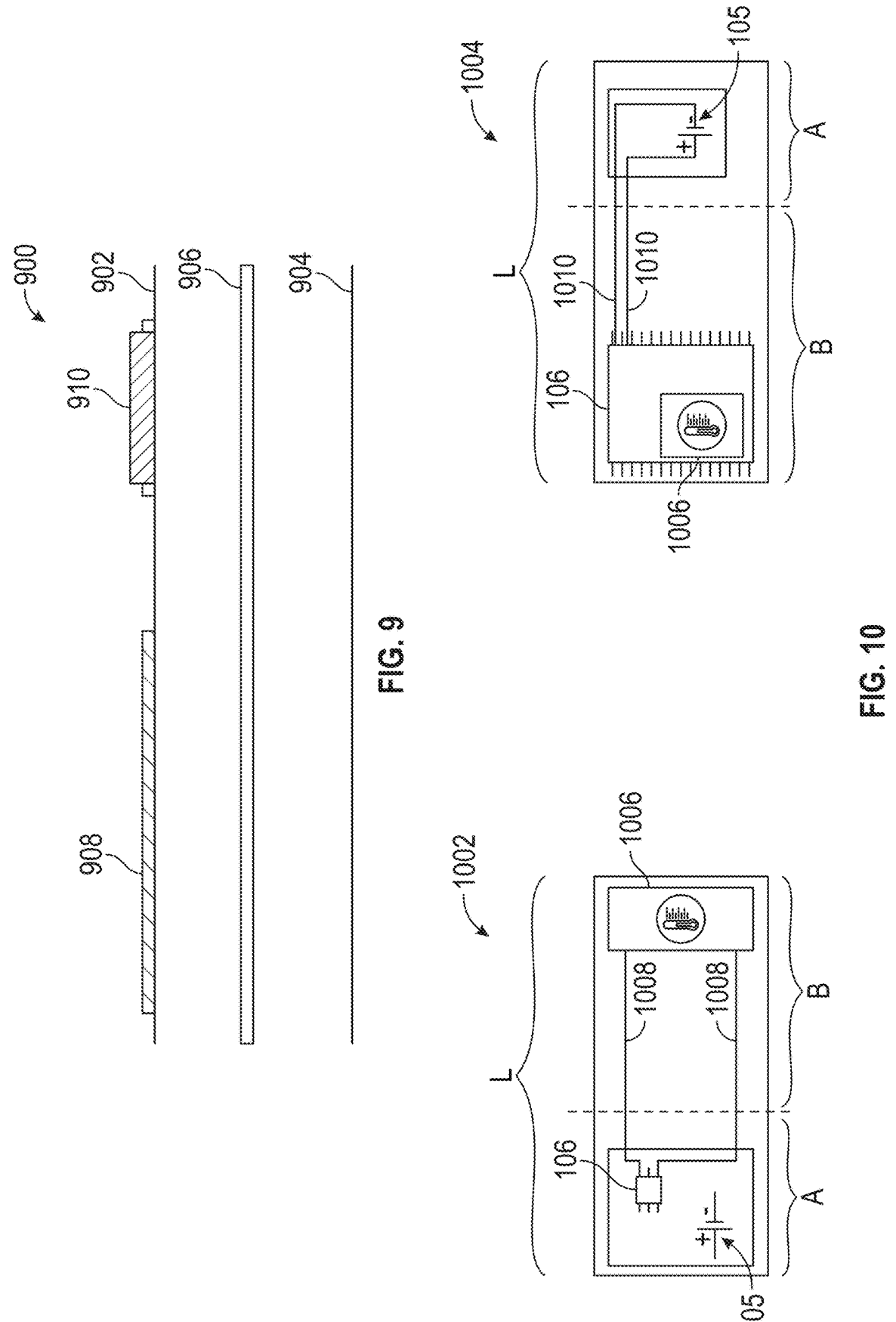
FIG. 9 illustrates a diagram of an architecture of a wireless label, having a thermocouple layer.
FIG. 10 illustrates some example constructions of wireless labels for subzero temperature monitoring applications.

FIG. 9 illustrates a diagram of an architecture of a wireless label 900, having a thermocouple layer. Not all layers of the wireless label 900 are shown. Wireless label 900 is similar to the wireless label 100. In some embodiments, the wireless label 100 can be constructed to have the features and/or architecture of the wireless label 900. The wireless label 900 includes a first and second conductive layers 902, sandwiching a PET layer 906. The first and second layers 902, 904 in some embodiments can be aluminum. The first layer 902 can include a microcontroller 910. In other words, the first conductive layer 902 in the wireless label 900 can be the same as, or similar to, the interconnect layer 104 in the wireless label 100. In other embodiments, the first layer 902 can be a separate layer than the interconnect layer, but electrically connected to the microcontroller 910. The first conductive layer 908 can be coated with a conductive material, for example, carbon, in selected portions. The selected portions can be portions that are expected to be exposed to a printhead, such as printhead 806, during printing process. The layers 902, 908 form a thermocouple layer in the architecture of the wireless label 900. The heat generated during the printing process, when absorbed by the thermocouple layer 902, 908, generates a thermocouple voltage, according to thermocouple properties of the conductive layers 902, 908. The thermocouple voltage is detected at an IPOP of the microcontroller 910. To increase the amount of thermocouple voltage, the conductive layers 902, 908 can be selected from dissimilar materials. For example, the conductive layer 902 can be aluminum, the coating layer 908 can be carbon. Other choices of conductive materials are also possible. In some embodiments, the printing process can be screen printing or a similar process.

Subzero Applications of Wireless Labels and Calibrating Wireless Labels for Subzero Applications The wireless label 100 or its variation can be used for subzero applications. In this context, subzero applications refer to using a wireless label 100 for temperature monitoring or other operations performed when a tracked item and/or an environment of a portion of the wireless label 100 is at a temperature at or below zero degree Celsius. Some batteries, including some batteries used in wireless labels 100, cannot efficiently operate in subzero temperatures. This can limit their applications, where portable temperature monitoring of refrigerated items is useful. As an example, wireless labels 100 can be affixed to shipment boxes, where the inside of the shipment box is kept at a subzero temperature, while the outside of the shipment box is exposed to a temperature above zero degree Celsius. Some shipment boxes can include an internal box, made from closed cell extruded polystyrene foam, or XPS, (e.g., Styrofoam®), or other relatively insulating material. The internal box can include ice, icepack, gel pack, freezer pack or similar material providing cooling. The shipment box and the internal box can be shipped or stored using non-refrigerated containers. Despite limitations of operation of batteries in subzero environments, the described embodiments can enable a wireless label 100 or a similarly structured thin or ultrathin wireless label to be used in subzero applications.

In some embodiments, the wireless label 100 can include two zones, a processing zone and a sensing zone. The processing zone can include active components, such as the battery, microcontroller, and communication components of the wireless label 100. The sensing components can include some sensors, including a temperature sensor, of the wireless label 100. In some embodiments, the temperature sensor of a wireless label is implemented with a thermistor, bonded to the interconnect layer, and connected via a trace to a GPIO or ADC input of the microcontroller 106. A thermistor is a resistor, whose resistance changes due to changes in temperature, allowing the thermistor to act as a temperature sensor. Alternatively, the temperature sensor can be a digital sensing device such as the TMP117 from Texas Instruments with an I2C connection to the host microcontroller in the processing zone. To enable usage of the wireless labels 100 in a subzero environment, the active and passive components can be manufactured in separate zones and with enough distance, such that passive components, related to sensing temperature, can be placed in or exposed to the subzero target environment, while the active components are placed outside of the subzero environment and not exposed to subzero temperatures. In this manner, the active components, particularly, the battery of the wireless label 100, is kept outside of the subzero environment, enabling correct operations of the battery, other active components and the wireless label 100 as a whole.

In some embodiments, the battery of the wireless label 100 can be isolated in a region of the wireless label 100, that is not exposed to subzero temperatures. FIG. 10 illustrates some example constructions of wireless labels 1002, 1004 for subzero temperature monitoring applications. The wireless label 1002 isolates a temperature sensor 1006 in a separate region of the label. The wireless label 1002 includes zone "A" components, such as the microcontroller 106, and the battery 105, and zone "B" components, such as the temperature sensor 1006. When the temperature sensor 1006 is implemented with a digital temperature sensing devices, three traces 1008 connect the device to an I2C port of the microcontroller 106.

The wireless label 1004 illustrates a construction of a subzero label in which the thin-film coated battery 105 is constructed in a separate zone from the temperature sensor 1006. In wireless label 1004, the temperature sensor 1006 is an internal component of the microcontroller 106. Two traces 1010 connect the battery 105 to a power supply port of the microcontroller 106. In this manner, the length "L" of the wireless label 1004 is divided into a zone "A," where the battery 105 is located, and a zone "B," where the remaining components of the wireless label, including the temperature sensor 1006 are located. In some embodiments, the temperature sensor 1006 can be a separate component from the microcontroller 106. In this scenario, the temperature sensor 1006 is still fabricated in zone, "B," separate from the battery component in zone "A."

In both wireless labels 1002, 1004, the battery 105 is isolated from the temperature sensor 1006. In this manner, the portion of the wireless label, which includes the temperature sensor, zone "B," in both labels can be exposed to subzero temperatures, while the remaining components, zone "A," in particular, the battery 105, can be away from the subzero temperatures.

Isolating the battery 105 from subzero temperatures also allows for calibrating the wireless labels 1002, 1004 for applications where the temperature sensor 1006 can be exposed to subzero temperatures. For example, in some embodiments, the wireless labels 1002, 1004 can be calibrated for use in temperatures from zero degree Celsius to −80 degrees Celsius. Other ranges for calibration and usage are also possible.

Similar to the wireless label 100, wireless labels 1002, 1004 can be manufactured and stored in reels, rolls, webs, or similar arrangements, where a plurality of the wireless labels 1002, or 1004 are manufactured and/or stored together. In other words, the wireless labels 1002, 1004 can be manufactured on a substrate, where a plurality of the wireless labels 1002, or 1004 are arranged.

Calibrating Wireless Labels for Subzero Applications

The substrate can be wound around a cylinder forming a reel of wireless labels. The reel of wireless labels can be unwound to perform calibration on individual labels or a group of labels. After calibration, the substrate, and the labels manufactured on the substrate, can be rewound into a reel, for example, around a second, third, or fourth cylinder, depending on the stage and number of calibration points.

In some embodiments, the substrate of the wireless labels 1002, 1004 can be unwound and traversed through a series of rollers. The rollers advance the substrate and the wireless labels 1002, 1004, along various calibration stations. Each calibration station can expose a wireless label 1002, 1004 or a group of the labels, to a selected calibration temperature. To calibrate a wireless label for a range of temperatures, multiple calibration stations can be provided, where each calibration station exposes the wireless label, or a group of wireless labels to a temperature in the range.

Figure 11A:
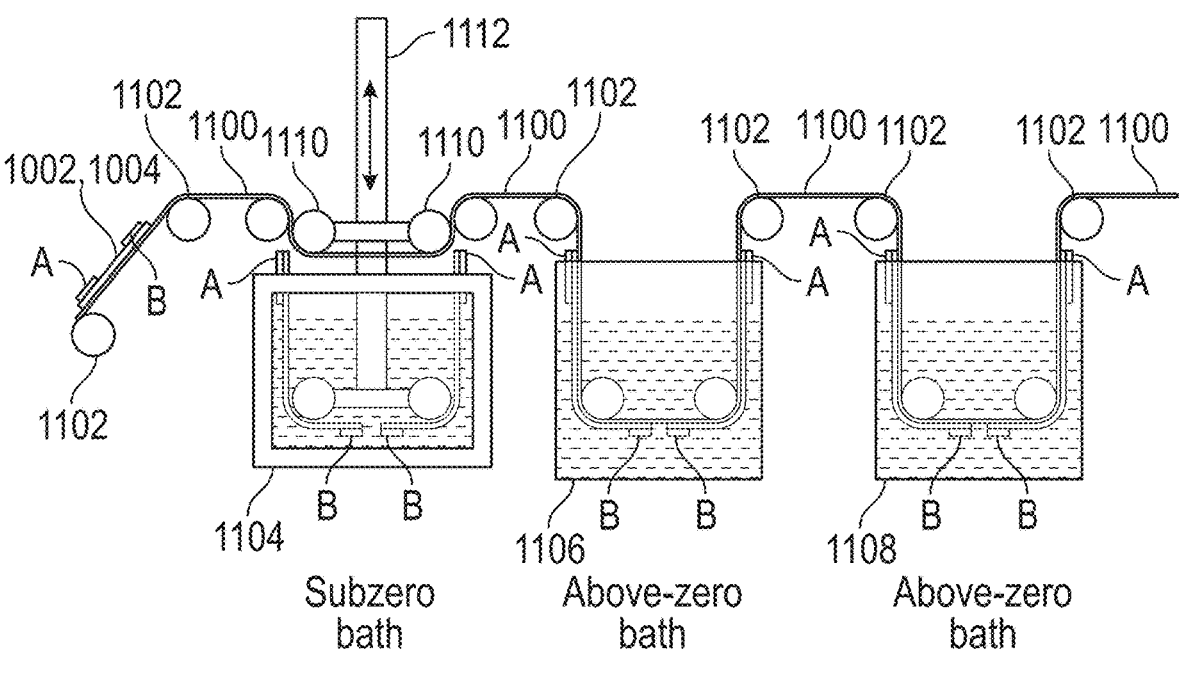
FIG. 11A illustrates a diagram of some components used in calibrating a group of wireless labels for subzero applications.

FIG. 11A illustrates a diagram of some components used in calibrating a group of wireless labels 1002, 1004 for subzero applications. The rollers 1102 unroll and advance a substrate 1100 or a roll of wireless labels 1002, 1004 through calibration stations 1104, 1106, and 1108. The calibration stations expose the labels to selected temperatures in a desired range of operation of the wireless labels. In the example shown, calibration stations and the corresponding calibration temperatures include both subzero and above zero temperatures. Consequently, the wireless labels calibrated using the components shown can be used in a range encompassing both subzero and above zero temperatures. The illustrated calibration stations are provided as examples, fewer or more calibration stations can be used, depending on the calibration methodology employed, the degree of accuracy, and/or other factors. For example, only one subzero calibration station 1104 is shown, but more subzero calibration stations can also be used, depending on the range of expected subzero operation of the labels. Additional subzero stations can operate similar to the subzero calibration station 1104.

A calibration station, such as the calibration stations 1104, 1106, 1108, includes a bath of thermally conductive fluid, kept at a target calibration temperature for that station. The calibration station 1104 is a subzero calibration station, having a subzero bath of thermally conductive fluid. The rollers 1110, directly above the subzero bath, can be attached to a shaft 1112. The shaft 1112 can move the rollers 1110 in a vertical direction, up and down, relative to the subzero bath below. The vertical movement of the rollers 1110 can plunge the substrate 1100 in the subzero bath in the portion between the rollers 1110. The distance between the two rollers 1110, relative to the distance between zones "A," and "B," on a wireless label 1002, 1004, can be selected such that the downward movement of the rollers 1110, exposes only the temperature sensor, zone "B," of the wireless label 1002, 1004 to the subzero bath, and keeps the battery component of the wireless labels 1002, 1004, zone "A," outside the subzero bath, and at room temperature. In this manner, subzero calibration operations can be performed, while the temperature sensor, zone "B," of a wireless label 1002, 1004, is submerged in a thermal bath of the selected calibration temperature, while the battery component, zone "A," of the wireless label, is not affected by the subzero temperature. Stated otherwise, the rollers 1110 in a first position, place the substrate 1100, and the wireless labels 1002, 1004, above and outside the subzero baths. In a second position, the rollers 1110, place the substrate 1100 and the wireless labels 1002, 1004 in a submerged position in a subzero bath, but only in the temperature sensor zone "B."

After calibration of a group of wireless labels 1002, 1004 at the subzero calibration station 1104 is concluded, the rollers 1110 return to the first position, allowing for the movement of the substrate 1100 through the rollers 1102 and other calibration stations, without submerging the battery components, zone "A," of the wireless labels, in the subzero baths. In other words, whenever the substrate 1100 is advancing, moving a second group of wireless labels to a next calibration station, the rollers 1110 are in the first position, avoiding exposing the battery components, zone "A," of the wireless labels, to the subzero baths.

Calibration stations 1106, 1108 can be above zero calibration stations. For these stations, submerging the entire wireless labels 1002, 1004 and both zones "A," and "B," of each label into an above-zero thermal bath, does not negatively impact the operation of the label. Consequently, these stations do not necessarily include actuating rollers 1110 and the shaft 1112. While not shown, heating components between calibration stations can speed up the recovery of the room temperature by the wireless labels emerging from a subzero thermal bath. Alternatively, the wireless labels 1002, 1004 can be calibrated from higher temperature baths to lower temperature baths and ultimately to subzero temperature baths. Regardless, cooling and/or heating components between calibration stations can normalize the temperature of the wireless labels before submerging them in the next calibration stage baths.

Figure 11B:
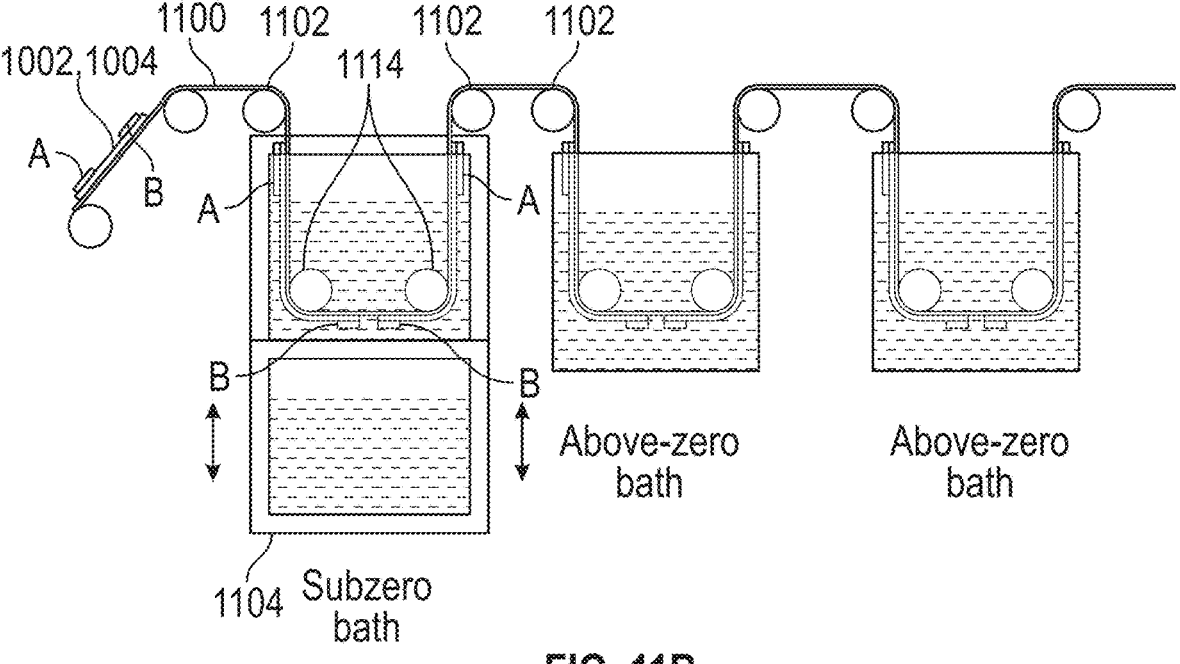
FIG. 11B shows an alternative arrangement of calibration components at a subzero calibration station.

FIG. 11B shows an alternative arrangement of calibration components at the subzero calibration station 1104. Instead of utilizing an actuating shaft 1112, the subzero bath can move upward and downward to submerge the temperature sensor, or zone "B," portion of the wireless labels. When the substrate 1100 is advanced through the rollers 1102, the subzero baths are in the lower position, such that the rollers 1114 above the subzero baths, the substrate 1100 and the wireless labels 1002, 1004, are not submerged in the subzero baths. The above-zero baths need not move upward or downward, as submerging the both zones of the labels in above-zero baths do not negatively impact the performance of the label.

Microchamber Calibration

Figure 12:
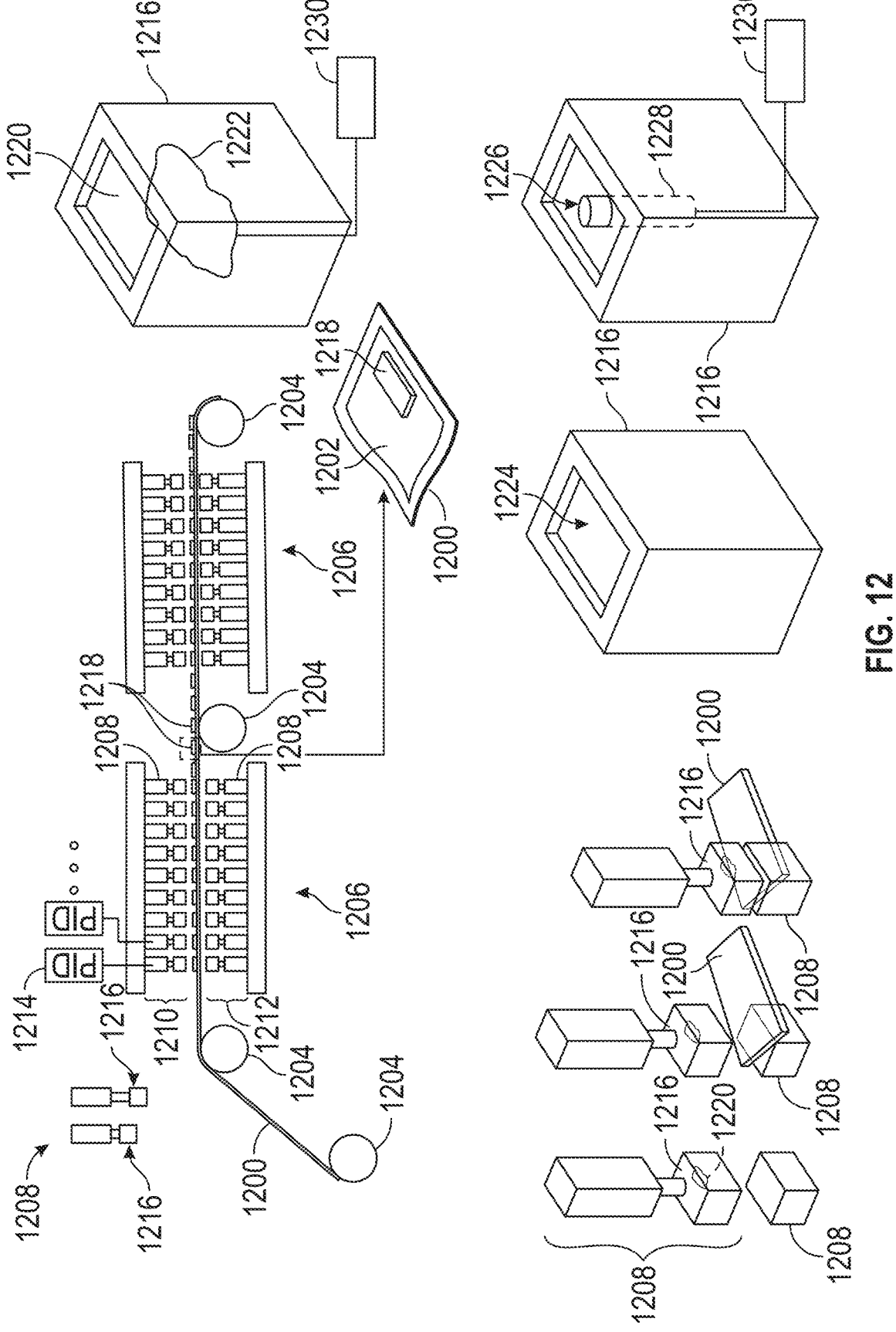
FIG. 12 illustrates diagrams of calibration components for calibrating the wireless labels, using microchambers.

FIG. 12 illustrates diagrams of calibration components for calibrating the wireless labels 1202, using microchambers. The wireless labels 1202 are manufactured on a substrate 1200. The rollers 1204 move the substrate 1200 along various calibration stations 1206. Each calibration station 1206 can include a plurality of actuatable microchambers 1208. Each calibration station 1206 can calibrate the wireless labels 1202 for a selected temperature. While two calibration stations are shown, fewer or more calibration stations can be used with the same described technology.

More calibration stations, or temperature calibration points can provide labels that can measure temperature more accurately. In some embodiments, instead of adding more calibration stations 1206, the same calibration stations can be reused for performing calibration of different temperatures, by rerunning the substrate 1200 through the rollers 1204 and each calibration station 1206, multiple times, corresponding to selected calibration points.

The microchambers 1208 can be arranged in two groups, a top group 1210 and a bottom group 1212. In the example shown, the top group 1210 can actuate a microchamber head 1216 in the vertical direction, moving the microchamber head up and down, relative to a wireless label 1202 on the substrate 1200. The microchamber heads 1216 can include an indentation or microcavity 1220. The microcavity 1220 encapsulates the temperature sensor 1218 of a wireless label 1202 when the microchamber head 1206 actuates down. When the microchamber head 1216 is in the down position, the microcavity 1220 provides a relatively insulated and efficient heating and cooling chamber. In the example shown, the microchambers in the top group 1210 include the microcavity 1220. Correspondingly, the substrate 1200 is positioned, such that the temperature sensors 1218 of the wireless labels 1220 face the microcavities 1220 and can be encapsulated by the microcavities 1220, when the microchamber heads 1216 are in the down position. In another embodiment, the bottom group microchambers can include the microcavities 1220 and the substrate 1200 can be positioned to face the temperature sensors 1218 of the wireless labels in the direction of the microcavities 1220. In this scenario, the bottom group microchambers actuate the microchamber heads 1216 in the up direction to encapsulate the temperature sensors 1218.

The placements and sizes of the microchambers 1208, and the microcavities 1220, can be designed to correspond to the placements and sizes of the temperature sensors 1208. Depending on the construction and integration of the temperature sensors 1218 in the wireless label 1202, the microcavities 1220 can encapsulate different elements or portions of the wireless label 1202. For example, the wireless label 1202 can utilize a microcontroller with an integrated temperature sensor. In this scenario, the microcavities 1220 encapsulate the microcontrollers of the wireless labels 1202. When the battery components of the wireless labels 1202 are isolated from the temperature sensors 1218, the illustrated calibration embodiments can also be applied by actuating the microchamber heads 1216 on the temperature sensor zones of the wireless labels. For such wireless labels, for example the wireless labels 1002, 1004, subzero calibration can be performed, by using the illustrated components.

The microchambers 1208 can be coupled to a proportional-integral-derivative (PID) device 1214, and to heating and cooling elements. The PID device 1214 can control the temperature of the microchamber head 1216 through receiving feedback from a temperature sensor 1222, integrated in the microchamber head 1216. The PID device 1214 can increase and/or decrease the temperature of the microchamber head 1216 through a feedback loop to maintain a selected calibration temperature. The heating and cooling elements, while not shown, can be integrated inside a portion of the microchambers 1208, or can be attached to one or more side walls of the microchamber heads 1216. In some embodiments, Peltier modules can provide cooling, while resistive elements can provide heating. The heating and cooling elements can heat or cool the microchamber head 1216 (and the microcavity 1220) to a selected calibration temperature.

Compared to calibration using submerging in a liquid of a selected calibration temperature, the microchamber calibration embodiments described above can be more efficient, as the microcavity can achieve a calibration temperature faster than a bath of fluid. Due to the smaller size of the microcavity 1220, the period of soaking, when using the microchamber calibration embodiments, compared to larger temperature chambers, is reduced. The period of soaking refers to the period of time after which the environment of the temperature sensor of a wireless label achieves a selected calibration temperature. Furthermore, microchamber calibration techniques described above can avoid inconsistencies that can occur using larger calibration chambers (e.g., environmental chambers). Large calibration chambers have the problem of inconsistency, where different sections of the chamber might in practice have a different real temperature than the reading indicated by the sensors of the chamber. For example, a section or pocket closer to the edges of the chamber might be at different temperatures, compared to the more interior portions of the chamber. Microchamber 1208 can avoid inconsistent temperatures that larger temperature chambers can exhibit.

To further increase the consistency of thermal contact between the temperature sensor 1218, and the microcavity 1220, the microcavity can be filled with a thermally conductive, but flexible, material, such as a thermally conductive gel 1224. The gel 1224 can be chosen from a semifluid material with viscosity, such that the gel 1224 can be used in the top group of microchambers 1208, without draining away from the microcavity 1220.

In some embodiments, to increase the accuracy of the temperature sensing by the temperature sensor of the microchamber head 1216, a spring-loaded temperature sensor 1226 can be used. The spring-loaded temperature sensor 1226 can be implanted in the deepest surface of the microcavity 1220. A spring 1228 can exert a force away from the deepest surface of the microcavity 1220 on the spring-loaded temperature sensor 1226. In this manner, when the microchamber head 1216 is in contact with a temperature sensor 1218 of a wireless label 1202, the spring 1228 exerts a force on the spring-loaded temperature sensor 1226 toward the temperature sensor 1218, thereby improving the consistency of thermal contact between the spring-loaded temperature sensor 1226 and the temperature sensor 1218 of the wireless label. In this manner, the temperatures registered by the spring-loaded temperature sensor 1226 more closely match the temperatures sensed by the temperature sensor 1218, thereby improving the quality of the calibration result. Both temperature sensors 1222 and 1228 can be in communication with a additional hardware, such as a controller circuit 1230, to report their temperature readings. In some embodiments, the controller circuit 1230 is implemented as a part of a PID, or is in communication with a PID.

EXAMPLES

It will be appreciated that the present disclosure may include any one and up to all of the following examples.

Examples Related to Activating a Label, Calibrating, and Storing Calibration Parameters Example 1: A method comprising: unwinding a reel of ultrathin wireless labels, the reel comprising multiple rows of a plurality of the ultrathin wireless labels, each wireless label comprising an interconnect layer, a microcontroller and one or more battery layers, the interconnect layer providing electrical connection between the microcontroller and the one or more battery layers, the microcontrollers of the wireless labels, having a hibernation state and an active state, the microcontrollers further comprising integrated temperature sensors; activating a selection of the wireless labels of the reel from hibernation state to active state, while the selection of the wireless labels are still in the reel; exposing the selection of the wireless labels to one or more selected calibration temperatures; receiving temperature readings from the integrated temperature sensors of the selection of the wireless labels, when the selection of the wireless labels are exposed to a selected temperature; generating calibration parameters based on the received temperature readings and the selected calibration temperatures; storing the calibration parameters for each wireless label of the selection of the wireless labels; placing the selection of the wireless labels into hibernation state; and rewinding the reel of the wireless labels.

Example 2: The method of Example 1, wherein exposing the selection of the wireless labels to a selected calibration temperature comprises submerging the selection of the wireless labels in a thermal bath, at a selected calibration temperature.

Example 3: The method of some or all of Examples 1 and 2, wherein the microcontrollers comprise wireless communication circuits, configured to broadcast data when the microcontrollers are in active state, the broadcast data, comprising one or more a request for connection beacon, and an identifier of the microcontroller, wherein the broadcast data further comprise the temperature readings, from each microcontroller, wherein exposing the wireless label to a selected calibration temperature comprises submerging the selection of the wireless labels in one or more thermal baths, each thermal bath at a selected calibration temperature, wherein receiving the temperature readings is via an antenna placed in the thermal baths.

Example 4: The method of some or all of Examples 1-3, wherein the calibration parameters are stored in a server, wherein a microcontroller of a wireless label comprises a wireless communication circuit, configured to broadcast data when the microcontroller is in active state, wherein the broadcast data comprises raw temperature readings, obtained by the integrated temperature sensor of the microcontroller when the wireless label is in active state, wherein the method further comprises: the server, receiving the raw temperature readings; and the server, generating field temperatures for the wireless label, based at least in part on the received raw temperature readings from the microcontroller of the wireless label, and the stored calibration parameters.

Example 5: The method of some or all of Examples 1-4, wherein a microcontroller of a wireless label comprises a wireless communication circuit, configured to broadcast data when the microcontroller is in active state, the broadcast data comprising raw temperature readings, obtained when the microcontroller of the wireless label is in active state, wherein the method further comprises: receiving the raw temperature readings for a wireless label; and generating field temperatures for the wireless label, based at least partly on the received raw temperature readings and the stored calibration parameters.

Example 6: The method of some or all of Examples 1-5, wherein a microcontroller of a wireless label comprises a wireless communication circuit, configured to broadcast data when the microcontroller is in active state, wherein the wireless communication circuit broadcasts data at a broadcasting rate, the data comprising raw temperature readings, obtained from the integrated temperature sensor when the microcontroller is in active state, wherein the method further comprises: receiving the raw temperature readings; generating field temperatures based on the received temperature readings and the stored calibration parameters; and reducing the broadcasting rate when the field temperatures are below a selected temperature.

Example 7: The method of some or all of Examples 1-6, wherein the calibration parameters are generated via linear regression.

Example 8: The method of some or all of Examples 1-7, wherein a wireless label further comprises: an adhesive, thermally conductive layer via which the wireless label is attachable to an object; and an insulating layer thermally insulating the interconnect layer, the microcontroller and the integrated temperature sensor.

Examples Related to Battery Saving Using Temperature Monitoring

Example 9: An ultrathin wireless label comprising: an interconnect layer, a microcontroller, an ultrathin battery layer, the interconnect layer providing electrical connection between the microcontroller and the battery layer, the microcontroller having a hibernation state and active state, wherein the microcontroller is configured to broadcast data at a broadcast frequency, when the microcontroller is in active state; a temperature sensor, integrated in the wireless label and configured to sense the temperature of the wireless label, whether the microcontroller is in active or hibernation state, the temperature sensor monitoring the temperature of the wireless label by periodically polling the temperature of the wireless label; wherein the microcontroller is configured to perform one or more battery saving operations comprising one or more of: transition between hibernation and active states, based on temperature readings from the temperature sensor, modulate the broadcast frequency, based at least in part on temperature readings, received from the temperature sensor, and modulate the period of the periodic temperature polling, based at least in part on the temperature readings from the temperature sensor.

Examples Related to Open-Box Detection, Based on Temperature Change, and Temperature Profiles Example 10: The ultrathin wireless label of Example 9, wherein the microcontroller is configured to indicate an open-box event when a temperature change beyond a selected threshold is indicated by the temperature readings from the temperature sensor.

Example 11: The ultrathin wireless label of some or all of Examples 9 and 10, wherein the open-box event is based on detecting a drastic change in the rate of temperature change reported by the temperature sensor.

Example 12: The ultrathin wireless label of some or all of Examples 9-11, wherein the microcontroller further comprises a permanent memory module configured to store one or more editable temperature profiles, wherein the profiles comprise one or more actions executable by the microcontroller and corresponding to a temperature reading, or a range of temperature readings, wherein the microcontroller is configured to perform the actions, based on the actions in the temperature profiles.

Examples Related to Resistance-Based Open-Box Detection

Example 13: A method of detecting open-box, comprising: providing an ultrathin wireless label, having a stacked plurality of layers, the layers comprising an interconnect layer, a microcontroller, an ultrathin battery layer, the microcontroller comprising a general-purpose input/output (GPIO) port, the interconnect layer providing electrical connection between the plurality of the layers; programming the microcontroller to apply a voltage to a selected layer of the wireless label, via the GPIO port of the microcontroller; the microcontroller, receiving a current, via the GPIO port, from the selected layer; the microcontroller generating a resistance value for the selected layer, based at least in part on the applied voltage and the received current at the GPIO port; the microcontroller, monitoring the resistance value of the selected layer; and the microcontroller, indicating an open-box event, based at least in part on a change in the monitored resistance value.

Example 14: The method of Example 13, wherein the ultrathin wireless label comprises a coated layer, comprising two conductive layer, electrically connected to the GPIO port, wherein the selected layer is the coated layer.

Example 15: The method of some or all of Examples 13 and 14, further comprising: measuring a closed-box reference resistance value; and indicating an open-box event, based on a comparison between the monitored resistance value and the reference resistance.

Examples Related to Using a Printhead to Activate the Wireless Label

Example 16: A method of activating an ultrathin wireless label, comprising: providing an ultrathin wireless label, having a stacked plurality of layers, the layers comprising an interconnect layer, a microcontroller, an ultrathin battery layer, the microcontroller comprising a general-purpose input/output (GPIO) port, the interconnect layer providing electrical connection between the plurality of the layers; detecting a voltage at the GPIO port of the microcontroller, the voltage generated on a selected layer of the wireless label, connected to the GPIO port, the voltage generated during printing on the wireless label, by a thermal printhead.

Example 17: The method of Example 16, wherein the selected layer of the wireless label comprises a thermocouple layer.

Examples Related to Subzero Labels and Calibration of Subzero Labels

Example 18: An ultrathin wireless label for subzero temperature monitoring applications, comprising: an elongated substrate layer; and an interconnect layer, a microcontroller, an ultrathin battery, and a temperature sensor, wherein the elongated substrate layer comprises first and second zones, separated by a distance, wherein exposing the first zone to a temperature does not substantially change a temperature of the second zone, and wherein the ultrathin battery is fabricated in the first zone and the temperature sensor is fabricated in the second zone.

Example 19: The wireless label of Example 18, wherein the temperature sensor is integrated in the microcontroller.

Example 20: The wireless label of some or all of Examples 18 and 19, wherein the temperature sensor is electrically connected to the microcontroller via a trace.

Example 21: A method of manufacturing and calibrating an ultrathin wireless label, comprising: providing an elongated substrate layer; providing an interconnect layer, a microcontroller, an ultrathin battery, and a temperature sensor, wherein the elongated substrate layer comprises first and second zones, separated by a distance, wherein exposing the first zone to a temperature does not substantially change a temperature of the second zone, and wherein the ultrathin battery is fabricated in the first zone and the temperature sensor is fabricated in the second zone; providing a plurality of calibration baths, each bath at a selected calibration temperature, wherein one or more baths comprise subzero baths at a selected calibration temperature below zero degrees Celsius; and for subzero baths, submerging only the second zone of the wireless label in the subzero bath, and maintaining the first zone outside the subzero bath.

Examples Related to Microchamber Calibration

Example 22: A method of calibration of ultrathin wireless labels, comprising: providing an actuatable microchamber, the actuatable microchamber comprising an actuatable microchamber head, the microchamber head comprising a heating element and a cooling module, the microchamber head comprising a cavity sized to match the size of a temperature sensor of the wireless label; encapsulating the temperature sensor of the ultrathin wireless label by the actuatable microchamber head, wherein the wireless label temperature sensor is encapsulated in the cavity; and applying a selected calibration temperature to the temperature sensor by providing heat to the cavity the heating element, or by removing heat from the cavity with the cooling module.

Example 23: The method of Example 22, wherein the cavity is filled with a thermally conductive gel.

Example 24: The method of some or all of Examples 22 and 23, wherein the heating element and the cooling module are controlled by a proportional-integrated derivative (PID) device.

Example 25: The method of some or all of Examples 22-24, wherein the cooling module is a Peltier module.

Example 26: The method of some or all of Examples 22-25, further comprising: providing a spring-loaded calibration temperature sensor integrated in the microchamber head, wherein the spring exerts a force on the calibration temperature sensor toward the encapsulated wireless label temperature sensor, providing continuous contact between the calibration temperature sensor and the wireless label temperature sensor.

It should be noted that the above Examples above can be combined to manufacture, calibrate and/or apply a wireless label, having features from the combined examples.

What is claimed is:

1. An ultrathin wireless label comprising:
an interconnect layer, fabricated of electrically conductive material, a microcontroller, an ultrathin battery layer printed on the interconnect layer, the interconnect layer, acting as an entirely electrically conductive substrate, wherein the microcontroller and the ultrathin battery are on a single side of the interconnect layer, the interconnect layer providing electrical connection between the microcontroller and the battery layer, the microcontroller having a hibernation state and active state, wherein the microcontroller is configured to broadcast data at a broadcast frequency, when the microcontroller is in active state;
a temperature sensor, integrated in the wireless label and configured to sense the temperature of the wireless label, whether the microcontroller is in active or hibernation state, the temperature sensor monitoring the temperature of the wireless label by periodically polling the temperature of the wireless label;

wherein the microcontroller is configured to perform one or more battery saving operations comprising one or more of:
transitioning between hibernation and active states, based on temperature readings from the temperature sensor, modulating the broadcast frequency, based at least in part on temperature readings, received from the temperature sensor, and modulating the period of the periodic temperature polling, based at least in part on the temperature readings from the temperature sensor; and
a thermocouple layer, comprising a portion of the interconnect layer coated in a conductive material dissimilar to the conductive material of the interconnect layer.

2. The ultrathin wireless label of claim 1, wherein the microcontroller is configured to indicate an open-box event when a temperature change beyond a selected threshold is indicated by the temperature readings from the temperature sensor.

3. The ultrathin wireless label of claim 1, wherein the open-box event is based on detecting a change in the rate of temperature change reported by the temperature sensor.

4. The ultrathin wireless label of claim 1, wherein the microcontroller further comprises a permanent memory module configured to store one or more editable temperature profiles, wherein the profiles comprise one or more actions executable by the microcontroller and corresponding to a temperature reading, or a range of temperature readings, wherein the microcontroller is configured to perform the actions, based on the actions in the temperature profiles.

5. The ultrathin wireless label of claim 1, wherein the dissimilar conductive material is carbon or any metal other than the metal used to fabricate the interconnect layer.

6. The ultrathin wireless label of claim 1, wherein the microcontroller is configured to detect a change in electrical resistance of the thermocouple layer, the change in electrical resistance corresponding to an open-box event.

7. The ultrathin wireless label of claim 1, wherein the microcontroller is configured to store or access a reference electrical resistance of the thermocouple layer, corresponding to a closed-box status of an item associated with the ultrathin wireless label.

8. The ultrathin wireless label of claim 1, wherein the microcontroller is configured to:
apply a voltage to the thermocouple layer, via a port of the microcontroller;
detect a current generated in the thermocouple layer; and
determine the electrical resistance of the thermocouple layer, based on the applied voltage and the detected current.

9. The ultrathin wireless label of claim 1, further comprising wireless communication circuitry configured to interface with a cloud infrastructure, the cloud infrastructure configured to perform off-chip processing and storage for the ultrathin wireless label.

10. The ultrathin wireless label of claim 1, wherein the microcontroller is configured to detect a voltage and/or current generated in the thermocouple layer by a printhead of a printer using a transitory thermal printing process.

11. An ultrathin wireless label comprising:
an interconnect layer, fabricated of electrically conductive material, a microcontroller, an ultrathin battery layer printed on the interconnect layer, the interconnect layer, acting as an entirely electrically conductive substrate, wherein the microcontroller and the ultrathin battery are on a single side of the interconnect layer, the interconnect layer providing electrical connection between the microcontroller and the battery layer, the microcontroller having a hibernation state and active state, wherein the microcontroller is configured to broadcast data at a broadcast frequency, when the microcontroller is in active state;

a temperature sensor, configured to sense the temperature of the wireless label, whether the microcontroller is in active or hibernation state, the temperature sensor monitoring the temperature of the wireless label by periodically polling the temperature of the wireless label;

wherein the interconnect layer comprises a processing zone and a sensing zone, wherein the processing zone comprises the microcontroller and the ultrathin battery and the sensing zone comprises the temperature sensor;

a trace running from the thermistor in the sensing zone to a port of the microcontroller in the processing zone, wherein the processing zone components and the sensing zone components are fabricated in an area of the interconnect layer at a distance, wherein exposing the sensing zone components to a subzero temperature does not expose the processing zone components to the subzero temperature;

wherein the microcontroller is configured to perform one or more battery saving operations comprising one or more of:

transitioning between hibernation and active states, based on temperature readings from the temperature sensor, modulating the broadcast frequency, based at least in part on temperature readings, received from the temperature sensor, and modulating the period of the periodic temperature polling, based at least in part on the temperature readings from the temperature sensor.

12. The ultrathin wireless label of claim 11, wherein the temperature sensor comprises: a thermistor bonded to the interconnect layer.

13. The ultrathin wireless label of claim 11, wherein the port of the microcontroller comprises general-purpose input/output (GPIO) port or an analog to digital converter (ADC) port.

14. The ultrathin wireless label of claim 11, wherein the microcontroller further comprises a permanent memory module configured to store one or more editable temperature profiles, wherein the profiles comprise one or more actions executable by the microcontroller and corresponding to a temperature reading, or a range of temperature readings, wherein the microcontroller is configured to perform the actions, based on the actions in the temperature profiles.

15. An ultrathin wireless label comprising:

an interconnect layer, fabricated of electrically conductive material, a microcontroller, an ultrathin battery layer printed on the interconnect layer, the interconnect layer, acting as an entirely electrically conductive substrate, wherein the microcontroller and the ultrathin battery are on a single side of the interconnect layer, the interconnect layer providing electrical connection between the microcontroller and the battery layer, the microcontroller having a hibernation state and active state, wherein the microcontroller is configured to broadcast data at a broadcast frequency, when the microcontroller is in active state;

a temperature sensor, configured to sense the temperature of the wireless label, whether the microcontroller is in active or hibernation state, the temperature sensor monitoring the temperature of the wireless label by periodically polling the temperature of the wireless label;

wherein the interconnect layer comprises a first zone and a second zone, wherein the first zone and the second zone are at a distance, wherein exposing the first zone to a subzero temperature does not expose the second zone to the subzero temperature;

a trace running from the first zone to the second, connecting one or more components in the first zone to components in the second zone, wherein the microcontroller is configured to perform one or more battery saving operations comprising one or more of:

transitioning between hibernation and active states, based on temperature readings from the temperature sensor, modulating the broadcast frequency, based at least in part on temperature readings, received from the temperature sensor, and modulating the period of the periodic temperature polling, based at least in part on the temperature readings from the temperature sensor.

16. The ultrathin wireless label of claim 15, wherein the first zone comprises the ultrathin battery and the microcontroller, and the second zone comprises the temperature sensor.

17. The ultrathin wireless label of claim 15, wherein the temperature sensor comprises a thermistor.

18. The ultrathin wireless label of claim 15, wherein the first zone comprises the microcontroller, and the microcontroller comprises the temperature sensor, and the second zone comprises the ultrathin battery.

* * * * *